United States Patent
Anand et al.

(10) Patent No.: US 12,061,465 B2
(45) Date of Patent: Aug. 13, 2024

(54) AUTOMATIC SYSTEM ANOMALY DETECTION

(71) Applicant: Bank of America Corporation, Charlotte, NC (US)

(72) Inventors: Vasuki Anand, Chennai (IN); Prashant Khare, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 59 days.

(21) Appl. No.: 17/652,631

(22) Filed: Feb. 25, 2022

(65) Prior Publication Data

US 2023/0273610 A1  Aug. 31, 2023

(51) Int. Cl.
*G05B 19/418* (2006.01)
*G05B 23/02* (2006.01)
*G06F 18/214* (2023.01)

(52) U.S. Cl.
CPC ... *G05B 19/41885* (2013.01); *G05B 19/4183* (2013.01); *G05B 19/4188* (2013.01); *G05B 23/0254* (2013.01); *G06F 18/214* (2023.01)

(58) Field of Classification Search
None
See application file for complete search history.

(56) References Cited

U.S. PATENT DOCUMENTS

| | | | |
|---|---|---|---|
| 6,625,569 | B2 | 9/2003 | James et al. |
| 8,271,949 | B2 | 9/2012 | Bernardini et al. |
| 9,848,007 | B2 | 12/2017 | Chen et al. |
| 9,891,983 | B1 | 2/2018 | Dechiaro |
| 9,954,882 | B2 | 4/2018 | Seo et al. |
| 10,037,025 | B2 | 7/2018 | Pallath et al. |
| 10,078,062 | B2 | 9/2018 | Eldardiry et al. |
| 10,410,113 | B2 | 9/2019 | Clayton et al. |

(Continued)

FOREIGN PATENT DOCUMENTS

| CN | 108780129 B | 3/2021 |
|---|---|---|
| EP | 3079336 A1 | 10/2016 |

(Continued)

OTHER PUBLICATIONS

Tan, Yongmin, Xiaohui Gu, and Haixun Wang. "Adaptive system anomaly prediction for large-scale hosting infrastructures." Proceedings of the 29th ACM SIGACT-SIGOPS symposium on Principles of distributed computing. 2010. (Year: 2010).*

(Continued)

*Primary Examiner* — Carlos R Ortiz Rodriguez

(57) ABSTRACT

A system includes a production computing environment including a plurality of components, a centralized data repository that receives and stores data feeds relating to one or more components as a data log and at least one processor configured to obtain the data log of each component, generate a current state vector for the component based on the data log, compare the current state vector to a normal state vector of the component, determine that the current state vector deviates from the normal state vector, and in response, predict an anomaly associated with the component using an iterative machine learning method. The at least one processor may be configured to correct the predicted anomaly by taking at least one pre-configured action corresponding to the predicted anomaly.

20 Claims, 4 Drawing Sheets

(56) References Cited

U.S. PATENT DOCUMENTS

| | | |
|---|---|---|
| 10,454,889 B2 | 10/2019 | Huang |
| 10,673,870 B2 | 6/2020 | Pierce |
| 10,678,829 B2 | 6/2020 | Park et al. |
| 10,693,896 B2 | 6/2020 | Kune et al. |
| 10,693,900 B2 | 6/2020 | Zadeh et al. |
| 10,740,310 B2 | 8/2020 | Gawlick et al. |
| 10,771,479 B2 | 9/2020 | Shahbaz et al. |
| 10,771,486 B2 | 9/2020 | Murphey et al. |
| 10,802,942 B2 | 10/2020 | Baghsorkhi et al. |
| 10,911,468 B2 | 2/2021 | Muddu et al. |
| 10,990,677 B2 | 4/2021 | Wiebe et al. |
| 11,019,088 B2 | 5/2021 | Pratt et al. |
| 11,030,166 B2 | 6/2021 | Swamy et al. |
| 11,042,145 B2 | 6/2021 | Zhang et al. |
| 11,095,690 B2 | 8/2021 | Luger |
| 11,138,056 B2 | 10/2021 | Lavid Ben Lulu et al. |
| 11,181,894 B2 | 11/2021 | Cantrell |
| 11,231,703 B2 | 1/2022 | Zhang et al. |
| 2013/0086431 A1 | 4/2013 | Arndt et al. |
| 2015/0339707 A1 | 11/2015 | Harrison et al. |
| 2016/0224453 A1 | 8/2016 | Wang et al. |
| 2017/0364818 A1 | 12/2017 | Wu et al. |
| 2018/0083908 A1 | 3/2018 | Dotan-Cohen et al. |
| 2018/0091609 A1 | 3/2018 | Xu et al. |
| 2018/0275667 A1 | 9/2018 | Liu et al. |
| 2019/0235944 A1 | 8/2019 | Velipasaoglu et al. |
| 2019/0354914 A1 | 11/2019 | Nicholas |
| 2020/0073740 A1 | 3/2020 | Ohana et al. |
| 2020/0241490 A1 | 7/2020 | Jermann et al. |
| 2020/0285997 A1 | 9/2020 | Bhattacharyya et al. |
| 2021/0157310 A1 | 5/2021 | Lavid Ben Lulu et al. |

FOREIGN PATENT DOCUMENTS

| | | |
|---|---|---|
| JP | 2017021790 A | 1/2017 |
| JP | 6141235 B2 | 6/2017 |
| JP | 2018524704 A | 8/2018 |
| JP | 6718994 B2 | 7/2020 |
| JP | 2022500745 A | 1/2022 |
| RU | 2686257 C1 | 4/2019 |
| WO | 2018005028 A1 | 1/2018 |

OTHER PUBLICATIONS

Buyya, Rajkumar, James Broberg, and Andrzej M. Goscinski, eds. Cloud computing: Principles and paradigms. John Wiley & Sons, 2010. (Year: 2010).*

Mahmood, Zaigham, ed. Cloud computing: Methods and practical approaches. Springer Science & Business Media, 2013. (Year: 2013).*

Hong, Bin, et al. "DAC-Hmm: detecting anomaly in cloud systems with hidden Markov models." Concurrency and Computation: Practice and Experience 27.18 (2015): 5749-5764. (Year: 2015).*

Ramezani, Fahimeh. Autonomic system for optimal resource management in cloud environments. Diss. 2016. (Year: 2016).*

Calheiros, Rodrigo N., et al. "On the effectiveness of isolation-based anomaly detection in cloud data centers." Concurrency and Computation: Practice and Experience 29.18 (2017): e4169. (Year: 2017).*

Ikeuchi, Hiroki, et al. "Root-cause diagnosis using logs generated by user actions." 2018 IEEE Global Communications Conference (GLOBECOM). IEEE, 2018. (Year: 2018).*

Ravi, Kumar, et al. "Analytics in/for cloud-an interdependence: a review." Journal of Network and Computer Applications 102 (2018) : 17-37. (Year: 2018).*

Xiao, Qili, et al. "Online machine health prognostics based on modified duration-dependent hidden semi-Markov model and high-order particle filtering." The International Journal of Advanced Manufacturing Technology 94 (2018): 1283-1297. (Year: 2018).*

Mukwevho, Mukosi Abraham, and Turgay Celik. "Toward a smart cloud: a review of fault-tolerance methods in cloud systems." IEEE Transactions on Services Computing 14.2 (2018): 589-605. (Year: 2018).*

Gill, Sukhpal Singh, et al. "Transformative effects of IoT, Blockchain and Artificial Intelligence on cloud computing: Evolution, vision, trends and open challenges." Internet of Things 8 (2019): 100118. (Year: 2019).*

Anand, V. et al., "Restoring a System by Load Switching to an Alternative Cloud Instance and Self Healing," U.S. Appl. No. 17/652,637, filed Feb. 25, 2022, 63 pages.

* cited by examiner

AUTOMATIC SYSTEM ANOMALY DETECTION

TECHNICAL FIELD

The present disclosure relates generally to data processing, and more specifically to automatic system anomaly detection.

BACKGROUND

A production computing environment of an organization is where the latest versions of software, products or updates are pushed live to the intended users. The production computing environment can be thought of as a real-time computing system where computer programs are run and hardware setups are installed and relied on for an organization's daily operations. The production computing environment is susceptible to system faults caused because of anomalies in one or more components operating in the production computing environment. These anomalies may include failure of hardware devices and/or errors in software applications. Often anomalies associated with the production computing environment may not be predicted in advance of the anomaly occurring. Further, when a system fault occurs, it takes considerable effort and time to identify the exact nature of an anomaly causing the system fault and the components involved and affected. Present methods for identifying and rectifying system anomalies in a production computing environment are reactive and often require lengthy debugging efforts to identify and fix a system anomaly, which can cause prolonged system downtime leading to service interruption, user dissatisfaction and lost revenues.

SUMMARY

The system and methods implemented by the system as disclosed in the present disclosure provide techniques for detecting and correcting anomalies in a production computing environment automatically, intelligently and in real time or near real time. The disclosed system and methods provide several practical applications and technical advantages.

For example, the disclosed system and methods provide the practical application of automatically detecting anomalies in components of the production computing environment in real time or near real time with a high degree of accuracy, and further to automatically and intelligently correct a system anomaly with minimal or no system downtime. As described in accordance with embodiments of the present disclosure, an anomaly manager predicts an anomaly associated with a component of the production computing environment based on real time data feeds relating to the component that indicate a real time performance of the component. To predict an anomaly associated with a component, the anomaly manager uses an iterative machine learning application that independently classifies the anomaly using a plurality of machine learning models and selects an anomaly prediction of a machine learning model having a highest associated accuracy metric. Once an anomaly related to a component is successfully predicted, the anomaly manager intelligently identifies a pre-configured corrective action associated with the identified anomaly and automatically performs the corrective action to correct the anomaly. Predicting anomalies relating to components of the production computing environment based on real time performance data of the components allows the anomaly manger to identify anomalous behavior occurring in the production computing environment in real time or near real time, thus allowing to apply a corrective action quickly to avoid or minimize service interruptions. Further, independently classifying an anomaly using several machine learning models and selecting the anomaly predicted by a model having the highest accuracy, allows the anomaly manager to predict the nature of detected anomalies with high degree of accuracy which in turn allows for selecting and applying the most appropriate corrective action to correct the anomaly.

The disclosed system and methods provide an additional practical application of switching a workload from the production computing environment to a cloud instance of a cloud infrastructure to avoid any system down time and service interruption that may be caused by an anomalous behavior of a component in the production computing environment. As discussed in accordance with embodiments of the present disclosure, in response to identifying an anomaly relating to a component of the production computing environment, the anomaly manager identifies a most cost effective and best suitable cloud instance from a plurality of cloud instances provided by a plurality of cloud infrastructures and switches at least a portion of the workload affected by an anomaly to the identified cloud instance. Switching the workload to the identified cloud instance may avoid service interruption that may be caused due to the anomalous behavior of the component. Further, switching the workload to the cloud instance provides an opportunity to take one or more corrective actions to correct the identified anomaly in the production computing environment without causing any system downtime that may cause service interruption within the production computing environment.

Thus, the disclosed system and methods improve the technology related to maintenance of production computing environments.

The disclosed system and methods provide an additional technical advantage of improving performance of a computing system configured to run the production computing environment or portions thereof. As disclosed in accordance with embodiments of the present disclosure, the disclosed systems and methods timely and automatically identifies and fixes anomalous behavior occurring in the production computing environment avoiding system downtime and consequential service interruption. By quickly identifying and fixing anomalies and avoiding system downtimes, the disclosed system and methods significantly improve the efficiency of the overall production computing environment, which in turn improves the overall processing performance of the computing system running the production computing environment.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
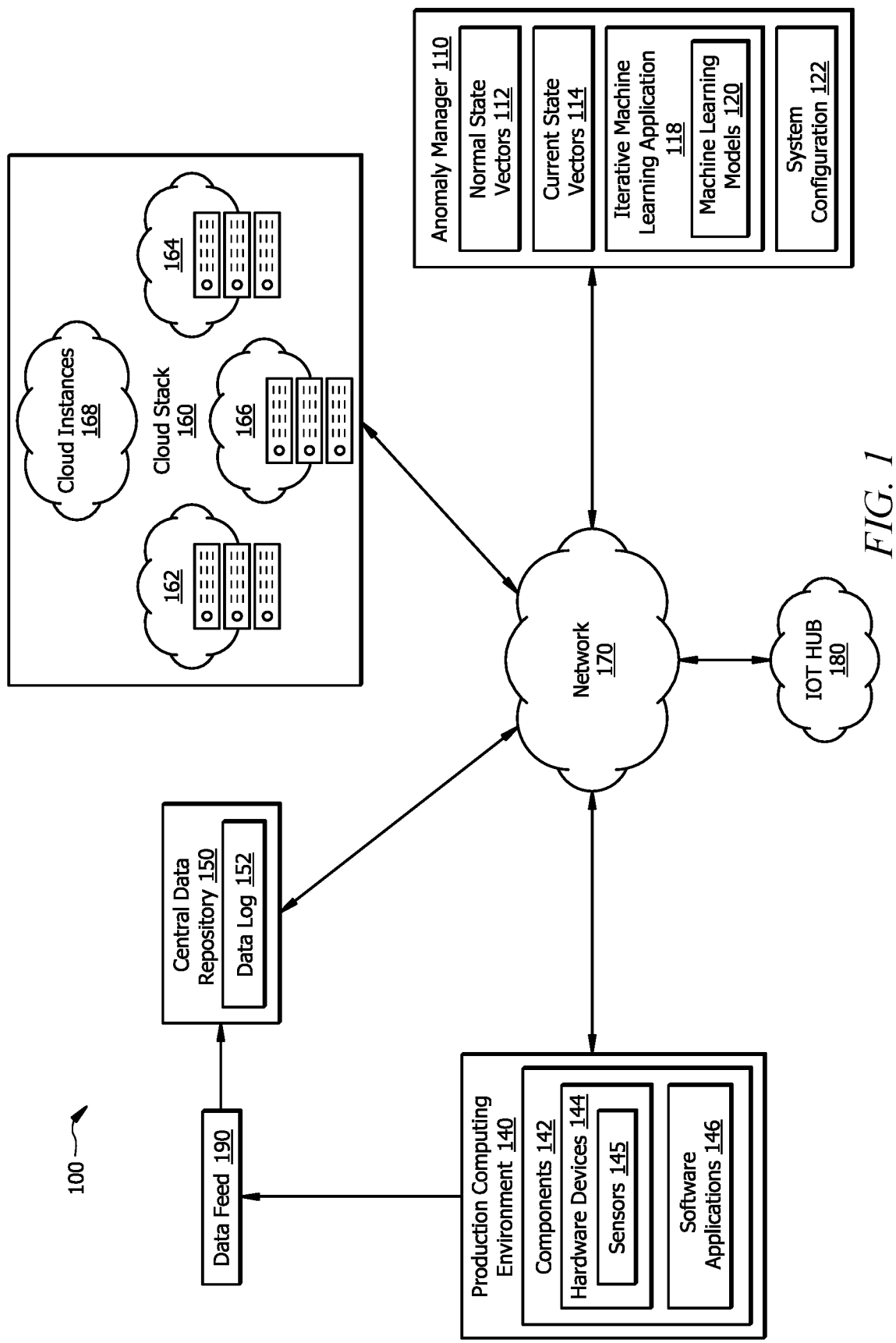
FIG. 1 is a schematic diagram of an example data processing system, in accordance with one or more embodiments of the present disclosure.

FIG. 1 is a schematic diagram of an example data processing system 100, in accordance with one or more embodiments of the present disclosure.

As shown in FIG. 1, data processing system 100 may include production computing environment 140, Internet of Things (IOT) hub 180, central data repository 150, cloud stack 160 and anomaly manager 110, each connected to a network 170. The network 170, in general, may be a wide area network (WAN), a personal area network (PAN), a cellular network, or any other technology that allows devices to communicate electronically with other devices. In one or more embodiments, the network 170 may be the Internet.

In one or more embodiments, each of the computing environment 140, IOT hub 180, central data repository 150, cloud stack 160 and anomaly manager 110 may be implemented by a computing device running one or more software applications. For example, one or more of the computing environment 140, IOT hub 180, central data repository 150, cloud stack 160 and anomaly manager 110 may be representative of a computing system hosting software applications that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the computing environment 140, IOT hub 180, central data repository 150, cloud stack 160 and anomaly manager 110 may be representative of a server running one or more software applications to implement respective functionality as described below. In certain embodiments, one or more of the computing environment 140, IOT hub 180, central data repository 150, cloud stack 160 and anomaly manager 110 may run a thin client software application where the processing is directed by the thin client but largely performed by a central entity such as a server (not shown).

Production computing environment 140 represents a computing environment of an organization where the latest versions of software, products or updates are pushed live to the intended users. The production computing environment 140 can be thought of as a real-time computing system where computer programs are run and hardware setups are installed and relied on for an organization's daily operations. As shown, production computing environment may include a plurality of components 142 including one or more hardware devices 144 and one or more software applications 146. Each of the plurality of component 142 may include a hardware device 144 or a software application 146. Hardware devices 144 may include, but are not limited to, one or more processors, one or more memory devices, servers, desktop computer, mobile computing devices, printed circuit boards (e.g., display cards, sound cards, interface cards etc.), electronic components (e.g. transistors, diodes, capacitors, resistors etc.) and machines. Software applications 146 may include software programs including, but not limited to, operating systems, user interface applications, third party software, database management software and other customized software programs implementing particular functionalities in the production computing environment 140.

In an embodiment, one or more software applications 146 are run using hardware devices 144 to implement one or more functionalities in the production computing environment 140. For example, software code relating to one or more software applications 146 may be stored in a memory device and one or more processors may process the software code to implement respective functionalities in the production computing environment 140. The production computing environment 140 is susceptible to system faults caused because of anomalies in one or more components 142 operating in the production computing environment 140. These anomalies may include failure of hardware devices 144 and/or errors (e.g., logical errors) in software applications 146. Often anomalies associated with the production computing environment 140 may not be predicted in advance of the anomaly occurring. Further, when a system fault occurs, it takes considerable effort and time to identify the exact nature of an anomaly causing the system fault and the components involved and affected. Present methods for identifying and rectifying system anomalies in a production computing environment 140 are reactive and often require lengthy debugging efforts to identify and fix a system anomaly, which can cause prolonged system downtime leading to service interruption, user dissatisfaction and lost revenues.

Aspects of the present disclosure discuss a system and methods implemented by the system to automatically detect anomalies in components 142 of the production computing environment 140 in real time or near real time, and further to automatically and intelligently correct a system anomaly with minimal or no system downtime.

Anomaly manager 110 may be configured to detect anomalies relating to one or more components 142 of the production computing environment 140 and take corrective actions to correct the anomalies and avoid system downtime.

A data feed 190 may be generated (e.g., by anomaly manager 110 or one or more other computing devices of the production computing environment 140) for one or more components 142 of the production computing environment 140, wherein the data feed 190 relating to the components 142 include information relating to real-time or near real-time performance of the components 142. The data feed 190 relating to a component 142 may include information indicative of whether the component is operating normally as expected. Performance related data may be generated for a plurality of software applications 146 and hardware devices 144. A data feed 190 may be generated for each component 142 including performance related data of the component 142. For example, performance related data generated for software applications 146 may include, but is not limited to, performance data relating to software applications being used by users of an organization that owns the production computing environment 140, performance data relating to software applications being used by external users to interact with the production computing environment 140 (e.g., at point of sale devices, ATMs, information kiosk devices etc.), performance data relating to operation of data centers used to store data (e.g., user data) in the production computing environment 140 and performance data relating to third-party software applications used but not owned by the organization. In one embodiment, the anomaly manager 110 (or one or more other computing devices) may run a software service tool that continually records performance logs for a software application 146 running in the production computing environment 140. The service tool may record several pre-configured events relating to the software application 146 including, but not limited to, information relating to logical exceptions, service errors, data access errors and other pre-configured exceptions and errors that may affect performance of the software application 146. A data feed 190 may be generated for each software application 146 based on the data log generated for the software application 146.

In one or more embodiments, performance related data may be generated for one or more hardware devices 144 using one or more hardware sensors. For example, one or more hardware sensors 145 may be provided that continually measure performance parameters associated with a hardware device 144. The performance parameters related of a hardware device 144 that can be measured by sensors 145 may include, but are not limited to, current, heat, voltage, power consumption, processing speed and network speed. Each of the parameters measured for a hardware device 144 is indicative of a performance of the hardware device 144 at the time the parameter was measured. For example, large data centers typically have cooling towers that maintain the heat of electronic components at desired levels to ensure performance of the electronic components within specified parameters. In this context, a rise in the heat beyond normal levels may indicate that the data center may not be operating within specified parameters. A data feed 190 may be generated for each hardware device 144 including values of the performance parameters as measured by one or more sensors 145.

Thus, the data feed 190 generated for each component 142 (e.g., hardware device 144 or software application 146) may include real-time information relating to a current performance of the component 142. In one or more embodiments, data feed 190 generated for each component 142 may be transmitted to a central data repository 150. Central data repository 150 may include a centralized repository that may receive and store data feeds 190 relating to each of a plurality of components 142 operating in the production computing environment 140 as raw data logs 152. In this context, raw data log 152 may refer to data relating to a component 142 (e.g., hardware device 144 or software application 146) that has not been organized or formatted for further processing. Performance related data collected for several software applications 146 (e.g., by anomaly manager 110 or one or more other computing devices of the production computing environment 140) may be transmitted for storage to the central data repository 150. In one embodiment, IoT hub 180 may act as a central message hub that collects real-time performance metrics (e.g., measured parameter values measured by sensors 145) for each hardware device 144 and transmits to the central data repository 150 a data feed 190 including the parameter values collected for each hardware device 144. The central data repository 150 may store the data received in the data feeds 190 from the IoT hub 180 as raw data logs 152 relating to the hardware devices 144.

Anomaly manager 110 may be configured to detect that an anomaly has occurred in relation to a component 142 of the production computing environment 140 based on the data log 152 of the component 142. Further, as further described below, the anomaly manager 110 can be configured to predict the particular nature of the anomaly corresponding to the component 142. The particular nature of the anomaly may include one or more hardware or software issues causing the anomaly related to the component 142.

Anomaly manager 110 may be configured to generate a current state vector 114 for each component 142 of the production computing environment 140 based on the data log 152 of the component 142 as stored in the central data repository 150. The current state vector 114 generated for a component 142 represents a current (e.g., real time or near real time) performance of the component 142. To generate the current state vector 114 for a component 142, the anomaly manager 110 may be configured to first obtain (e.g., receive) the raw data logs 152 of components 142 from the central data repository 150. The anomaly manager 110 is configured to segregate the raw data stored in the raw data log 152 using a clustering and aggregation algorithm. Once the data in the data log 152 is segregated, the anomaly manager 110 is configured to extract from the data log 152, data relating to the current performance of the component 142 and generate a current state vector 114 that is indicative of the current performance of the component 142. In an embodiment, the anomaly manager 110 is configured to generate the current state vector 114 for a component 142 based on the most recent performance data obtained for the component 142 from the data feeds 190 generated for the component 142, so that the current state vector 114 represents the most recent performance of the component 142. The anomaly manager 110 includes at least a portion of the performance related data of the component 142 (e.g., from the data log 152) in the current state vector 114 generated for the component 142. The performance related data included in the current state vector 114 of the component 142 may include real-time or near real-time data collected for the component 142.

In one example, anomaly manager 110 may extract from the central data repository 150, the most recent values of one or more performance related parameters for a hardware device 144. The anomaly manager 110 may generate a current state vector 114 for the hardware device 144 based on the data extracted from the central data repository 150, wherein the current state vector 114 may include the most recent values of one or more parameters that are indicative of the current performance of the hardware device 144. For example, the current state vector 114 may include values of parameters including, but are not limited to, current, heat, voltage, power consumption, processing speed, network speed and vibrations. The values of the parameters included in the current state vector 114 may be indicative of the real-time or near real-time performance of the hardware device 144. Similarly, in one example, a current state vector 114 generated for a software application 146 may include at least a portion of the most recent data logs collected for the software application, including but not limited to, information relating to logical exceptions, service errors, data access errors and other pre-configured exceptions and errors that may affect performance of the software application 146. The data included in the current state vector 114 may be indicative of the real-time or near real-time performance of the software application 146.

Anomaly manager 110 may be configured to continually generate state vectors for each component 142 of the production computing environment 140 according to a pre-configured schedule (e.g., periodically after fixed time intervals), thus capturing the real-time or near real-time performance of each component 142.

Anomaly manager 110 may be configured to detect an anomaly associated with operation of a component 142 in the production computing environment 140. A detected anomaly relating to a component 142 may indicate that the component 142 may not be operating normally. Anomaly manager 110 may have access to a normal state vector 112 for each component 142, wherein the normal state vector 112 for a component 142 includes data indicative of normal performance of the component 142. Normal performance of a component 142 may include performance of the component 142 within specified parameters. For example, the normal state vector 112 of a hardware device 144 may include a value or range of values for each of one or more performance related parameters, wherein the value or range of values of a parameter equals or is within a normal range specified for the hardware device. For example, the normal state vector 112 for a hardware device 144 may include values of parameters including, but not limited to, current, heat, voltage, power consumption, processing speed, network speed and vibrations. In one embodiment, the normal parameter value ranges of hardware devices 144 are as defined by the individual device ratings. A normal state vector 112 for a software application 146 may include data logs relating to software application 146 that represent normal error-free operation of the software application 146.

To determine whether an anomaly exists relating to a component 142, anomaly manager 110 compares the current state vector 114 of the component 142 with the normal state vector 112 of the component. The anomaly manager 110 may be configured to detect that an anomaly exists in the operation of a component 142 when the current state vector 114 does not match, at least in part, with the normal state vector 112 of the component 142. For example, anomaly manager 110 may be configured to detect that an anomaly exists in the operation of a hardware device 144 when at least one value of a parameter included in the current state vector 114 of the hardware device 144 deviates from the corresponding value or range of values of the parameter included in the normal state vector 112 of the hardware device 144. For example, anomaly manager 110 determines that an anomaly exists in the operation of the hardware device 144 when the value of the parameter as included in the current state vector 114 is not within the normal range of values of the parameter as included in the normal state vector. Similarly, anomaly manager 110 may be configured to determine that an anomaly exists in the operation of a software application 146 when at least a portion of the data logs included in the current state vector 114 of the software application does not match with the corresponding data logs in the normal state vector 112 of the software application 146. In one or more embodiments, the anomaly manager 110 may be configured to continually (e.g., periodically or according to a pre-configured schedule) match the current state vector 114 of each component 142 as they are generated to the normal state vector 112 of the component 142. This helps the anomaly manager 110 to detect anomalies in operation of components 142 in real-time or near-real time.

When an anomaly is detected corresponding to a component 142 by the anomaly manager 110 (e.g., when the current state vector 114 deviates from the normal state vector 112), anomaly manager 110 may further be configured to determine a nature of the anomaly. In other words, the anomaly manager 110 may be configured to determine the particular software and/or hardware issue/error that may be causing the current state vector 114 to deviate from the normal state vector 112. Anomaly manager 110 may be configured to use an iterative machine learning application 118 to identify and classify a detected anomaly relating to a component 142. To identify and classify an anomaly, the iterative machine learning application 118 may use data including but not limited to, data log 152 of the component 142, current state vector 114 generated for the component 142, normal state vector 112 of the component 142, results from the comparison of the current state vector 114 with the normal state vector 112 of the component 142 and information from failure repository 116 (including failure symptoms, corresponding hardware/software issues causing the failure symptoms and corrective actions to correct the anomaly).

The iterative machine learning application 118 may include using a plurality of machine learning models 120 that can independently classify an anomaly detected in relation to a component 142 and identify the nature of the detected anomaly. Identifying the nature of a detected anomaly may include identifying the hardware/software error that may have caused the anomaly in the component 142. Each of the plurality of machine learning models 120 may use a different technique/algorithm to classify the detected anomaly relating to a component 142. Anomaly manager 110 may be configured to generate the plurality of machine learning models 120 and then use the generated models 120 to classify detected anomalies related to components 142. The iterative nature of the technique used by the iterative machine learning application 118 includes iteratively training each machine learning model 120 to classify anomalies related to a component 142 based on the most training dataset relating to the component 142. For example, anomaly manager 110 may be configured to re-train each machine learning model 120 to classify anomalies related to a component 142 based on the most recent training dataset relating to the component. The most recent training dataset relating to a component may include, but is not limited to, the most recent data log 152 of the component 142 (including the most recent data feed 190 for the component 142), the normal state vector 112 of the component 142, a current state vector generated for the component 142, the failure repository 116, results from previous comparisons of the current state vector 114 with the normal state vector 112 of the component 142, and results from previous classification of anomalies for the component 142. Anomaly manager 110 may be configured to re-train each machine learning model 120 based on a pre-configured schedule (e.g., periodically after fixed time intervals). In one embodiment, anomaly manager 110 may be configured to re-train one or more models 120 when a deviation is detected between the current state vector 114 and normal state vector 112 of a component 142. By iteratively updating the training of the machine learning models 120, anomaly manager 110 helps continually refine the models 120 and improve classification and prediction of the nature of identified anomalies.

When a potential anomaly is detected in the operation of a component 142 (e.g., based on comparison of the current state vector 114 and normal state vector 112 of the component 142), anomaly manager 110 may be configured to independent classify the detected anomaly using a plurality of the machine learning models 120. Anomaly manager 110 analyzes results of the classifying using the plurality of machine learning models 120 to determine which one of the models 120 predicted the nature of the anomaly with the higher accuracy. In one embodiment, anomaly manager 110 may compares an accuracy metric for each machine learning model 120 and determines which one of the machine learning models 120 has the highest accuracy metric. The accuracy metric is indicative of an accuracy of anomaly prediction made by a particular machine learning model 120, wherein a higher accuracy metric corresponding to a higher accuracy of anomaly prediction. Anomaly manager 110 selects the machine learning model 120 having the highest associated accuracy metric and designates the anomaly predicted by the selected model 120 as the predicted nature of the anomaly associated with the detected anomaly. By continually re-training the models 120, independently classifying a detected anomaly using several models 120 and selecting the anomaly predicted by a model 120 having the highest accuracy, allows the anomaly manager 110 to predict the nature of detected anomalies with high accuracy. A predicted nature of an anomaly may include a failure of or error in a hardware device 144, an error in a software application, or a combination thereof.

In one or more embodiments, anomaly manager 110 may be configured to update the normal state vector 112 of a component 142 based on results of predicting a nature of a detected anomaly based on the iterative machine learning application. For example, when a deviation is detected between a current state vector 114 generated for a component 142 and the normal state vector 112 of the component, anomaly manager 110 may classify the detected anomaly as described above based on the iterative machine learning application 118. However, after running the plurality of ML models 120 and analyzing the results of the models 120, anomaly manager 110 may determine that no hardware/software fault in the component 142. In response, anomaly manager 110 may add at least a portion of data from the current state vector 114 to the normal state vector 112, so that when performance related data similar to what is included in the current state vector 114 is subsequently obtained for the component, anomaly manager 110 may not again detect a deviation/anomaly. For example, when a measured current value relating to a hardware device as included in the current state vector 114 for the hardware device deviates from the normal range of current values included in the normal state vector 112 of the hardware device, anomaly manager 110 may not detect a hardware/software fault causing the deviation. Consequently, anomaly manager 110 may add the measured current value as a normal current value in the normal state vector 112 of the hardware device. Accordingly, when the same current values is subsequently measured for the hardware device, anomaly manager 110 may not detect a deviation from the normal state vector and may not raise a flag to predict a hardware/software fault.

In certain embodiment, one or more of the plurality of machine learning models may be designed to predict anomalies for certain types of components 142 or individual components 142. Anomaly manager 110 may select multiple models 120 from the plurality of models 120 based on the component 142 for which an anomaly was detected. For example, the data feed 190 relating to a component 142 may include an indicator of whether the data in the data feed 190 corresponds to a hardware device 144 or a software application 146. Anomaly manager 110 may select models 120 to predict a nature of a detect anomaly relating to a component based on whether the component 142 is a hardware device 144 or a software application 146.

Once a nature of a detected anomaly (e.g., a hardware/software fault or error) relating to a component 142 has been predicted, anomaly manager 110 may be configured to automatically identify a corrective action corresponding to the predicted anomaly and further automatically perform the identified corrective action to correct the anomaly to resume normal operation of the component 142 and to avoid system downtime caused by the faulty component 142. Anomaly manager 110 may have access to a failure repository 116 that includes a list of failure symptoms, known hardware/software faults causing those failure symptoms and one or more corrective actions corresponding to each hardware/software fault. A set of failure symptoms in the failure repository 116 may correspond to a detected anomaly or deviation as described above of the current state vector 114 from the normal state vector 112 for a component 142, and a corresponding hardware/software fault may correspond to the predicted nature of the detected anomaly that may be causing the deviation. Thus, for every predicted anomaly that corresponds to a known hardware/software fault listed in the failure repository 116, a respective corrective action may be provided in the failure repository 116 to correct the hardware/software fault.

Anomaly manager 110 may be configured to search the failure repository 116 for a hardware/software fault corresponding to a predicted anomaly relating to a component 142 and identify one or more corrective actions that may correct the anomaly and restore the component 142 to a normal operation. The failure repository 116 may include several types of faults and corresponding corrective actions. For example, when the fault includes an error or failure in a hardware device 144, the corresponding corrective action may include switching to an alternative hardware device 144 or resetting the hardware device 144 to an original factory setting. When the anomaly includes a logical error associated with a software application 146, the corrective action may include resetting the software application 146 to an original factory setting or applying a pre-configured software patch to correct the logical error. When the fault includes a data breach associated with a software application 146, the corrective action may include transmitting a message to an administrator responsible for system security. When the fault includes an error associated with accessing a software application 146, the corrective action may include checking access level of an accessing user or entity and initiating access correction. It may be noted that the above discussed examples of faults and respective corrective actions is not an exhaustive list and that a person having ordinary skill in the art can appreciate that there may be other types of faults that cause anomalous behavior within the production computing environment 140 and respective corrective actions that may be performed to correct the anomalous behavior.

In some cases, when a component 142 behaves in an anomalous manner, the anomalous behavior may cause partial or total service interruption in the production computing environment 140. Anomaly manager 110 may be configured to identify and correct the anomalous behavior within the production computing environment 140 in a way that avoids or eliminates any system downtime that may be caused by the anomalous behavior. Production computing environment 140 may include a cloud stack 160 having a plurality of cloud infrastructures (shown as 162, 164 and 166). It may be noted that cloud stack 160 is shown to include three cloud infrastructures 162-166 for exemplary purpose and for ease of illustration, and that cloud stack 160 may include less than three or more than three cloud infrastructures. Each of the cloud infrastructures 162-166 may be communicatively coupled to one or more other devices in system 100 (e.g., anomaly manager 110 and/or one or more components 142 of the production computing environment 140), for example, via network 170. Each cloud infrastructure 162-166 may include a set of one or more hardware resources and software resources. In this context a hardware resource may include but is not limited to, a processor, a memory device, a server, a database, or any other hardware device, machine or component that can replace or perform the function of one or more hardware devices 144 in the production computing environment 140. A software resource may include, but is not limited to, a software program or application such as an operating system, user interface or other customized software that can implement one or more functionalities performed by software applications 146 in the production computing environment 140. Each of the cloud infrastructures 162-166 may provide pre-configured cloud instances 168, wherein each cloud instance 168 of a cloud infrastructure includes a unique set of hardware and/or software resources. In cloud computing, a cloud instance 168 generally refers to a virtual machine that uses one or more hardware and/or software resources of a cloud infrastructure to run a workload. The term "workload" generally refers to an application or service deployed using a computing machine (e.g., virtual machine) that consumes resources such as computing power and memory. In addition to the pre-configured cloud instances 168, one or more of the cloud infrastructures 162-166 may allow customized cloud instances to be created to cater to customized needs. In one embodiment, each cloud infrastructure 162-166 may be provided by a different cloud vendor.

Anomaly manager 110 may be configured to switch (e.g., at least temporarily) at least a portion of a workload from a current system to one or more cloud instances of a cloud infrastructure 162-166 to avoid service interruption in the production computing environment. For example, when an anomalous behavior in a component 142 of the production computing environment 140 may cause partial or total service interruption, anomaly manager 110 may be configured to switch at least a portion of the workload running on an original computing device or system of the production computing environment 140 to a cloud instance 168 of one of the cloud infrastructures 162-166. Switching the workload to a cloud instance 168 may include switching one or more software applications 146 running using the original machine or system to the cloud instance 168. In one embodiment, switching the workload may include switching a software application 146 behaving anomalously along with one more other software applications 146 affected by the anomalous behavior. Switching the workload to the cloud instance 168 may avoid service interruption that may be caused due to the anomalous behavior of the component 142. For example, when an anomaly is detected relating to a processor running at least a portion of the workload in the production computing environment 140, anomaly manager 110 may switch the portion of the workload currently run by the processor to a cloud instance 168 so that the portion of the workload is run in the cloud instance using cloud resources. This avoids the anomalous processor from causing partial or total service interruption. Further, switching the workload or a portion thereof to a cloud instance provides an opportunity to take one or more corrective actions to correct a detected anomaly in the production computing environment 140 without any system downtime that may cause service interruption within the production computing environment 140. In one embodiment, only a portion of the workload affected by the anomalous behavior of a component 142 may be switched to an appropriate cloud instance 168, while continuing to run a remaining portion of the workload using computing systems of the production computing environment 140.

Anomaly manager 110 may be configured to search each of the cloud infrastructures 162-166 for a cloud instance 168 having configuration that can support the workload that is to be switched from an original system in the production computing environment 140. In this context, the term "configuration" may refer to hardware resource (e.g., processors, memory devices, databases, serves etc.), software resources (e.g., operating systems, user interfaces, third party software etc.) or a combination thereof. When an anomaly related to a component 142 is identified and predicted as described above, anomaly manager 110 identifies a workload running in the production computing environment 140 that can be affected by the identified anomaly in the component 142 and further identifies a system configuration 122 needed to support the workload. The identified workload may include one or more software applications 146 and the identified system configuration 122 may include one or more hardware resources, one or more software resource or a combination thereof. After identifying the system configuration 122 needed to run the identified workload, anomaly manager 110 may be configured to search each of the plurality of cloud infrastructures 162-166 for a cloud instance 168 that can support the identified system configuration 122. For example, anomaly manager 110 may search for a cloud instance 168 that includes at least a minimum amount of hardware and/or software resources needed to support the identified system configuration 122 and run the identified workload. In one embodiment, a vendor of each of the cloud infrastructure 162-166 may provide access to information relating configurations of all cloud instances 168 provided by the cloud infrastructure 162-166. Anomaly manager 110 may access and search the provided information for each cloud infrastructure 162-166 to identify the required cloud instance 168. As a result of the search, anomaly manager 110 may identify at least one cloud instance 168 of a corresponding cloud infrastructure 162-166 that can support the identified system configuration 122. Anomaly manager 110 may initiate a identified cloud instance 168 and switch the identified workload from the original system in the production computing environment 140 to the identified cloud instance 168. Initiating the identified cloud instance 168 may include creating in the cloud infrastructure a virtual machine corresponding to the identified cloud instance.

In some cases, anomaly manager 110 may identify more than one cloud instance 168 that can support the system configuration 122, wherein at least two of the identified cloud instances 168 may be provided by different cloud infrastructures managed by different cloud vendors. In such cases, anomaly manager 110 may be configured to select a most cost-effective cloud instance 168 among the identified cloud instances 168 that can support the system configuration 122. Each cloud vendor may provide the anomaly manager 110 access to information including pricing associated with the cloud instances 168 provided by a respective cloud infrastructure 162-166. Anomaly manager 110 may be configured to search the information to determine the pricing associated with each identified cloud instance 168 that can support the system configuration 122. Anomaly manager 110 may be configured to select a cloud instance 168 that is associated with the lowest pricing among the plurality of identified cloud instances 168. Once the most cost-effective cloud instance 168 is selected, anomaly manager 110 may be configured to transfer the identified workload to the selected cloud instance 168.

Anomaly manager 110 may be configured to temporarily switch the workload to a cloud instance 168 as described above, and to switch back the workload back to the original computing system of the production computing environment 140 when the anomaly identified in the production computing environment 140 has been corrected. For example, when an anomaly is detected relating to a processor running at least a portion of the workload in the production computing environment 140, anomaly manager 110 may switch the portion of the workload currently run by the processor to a cloud instance 168 so that the portion of the workload is run in the cloud instance 168 using cloud resources. After the workload has been switched to the cloud instance 168, anomaly manager 110 may perform one or more corrective actions to correct the anomaly. When the anomaly has been corrected and the original system is operating normally, anomaly manager 110 may switch back the workload to the original system, thus restoring the production environment to full operation.

In one or more embodiments, anomaly manager 110 may use quantum computing to perform at least a portion of the operations described above. Large production computing environments may have several hundred or even thousands of components 142 generating huge amounts of performance related data. In order to identify an anomaly associated with a component of the production computing environment 140 in real time or near real time, all the data generated for the components 142 needs to be processed very quickly. Quantum computing may be used to process data in real time or near real time so that anomalies are identified in real time and corrective actions are taken before any service interruption occurs. For example, anomaly manager 110 may use quantum processors running one or more quantum bots to perform operations described above including, but not limited to, generating current state vectors 114 based on real time data logs of components 142, detecting an anomaly related to a component 142 based on comparison of the current state vector 114 and normal state vector 112 of the component, predicting a nature of the detected anomaly using the iterative machine learning application 118, identifying a cost-effective cloud instance for transferring a workload from the production computing environment 140 and identifying and performing corrective actions to correct identified anomalies in the production computing environment 140.

Figure 2:
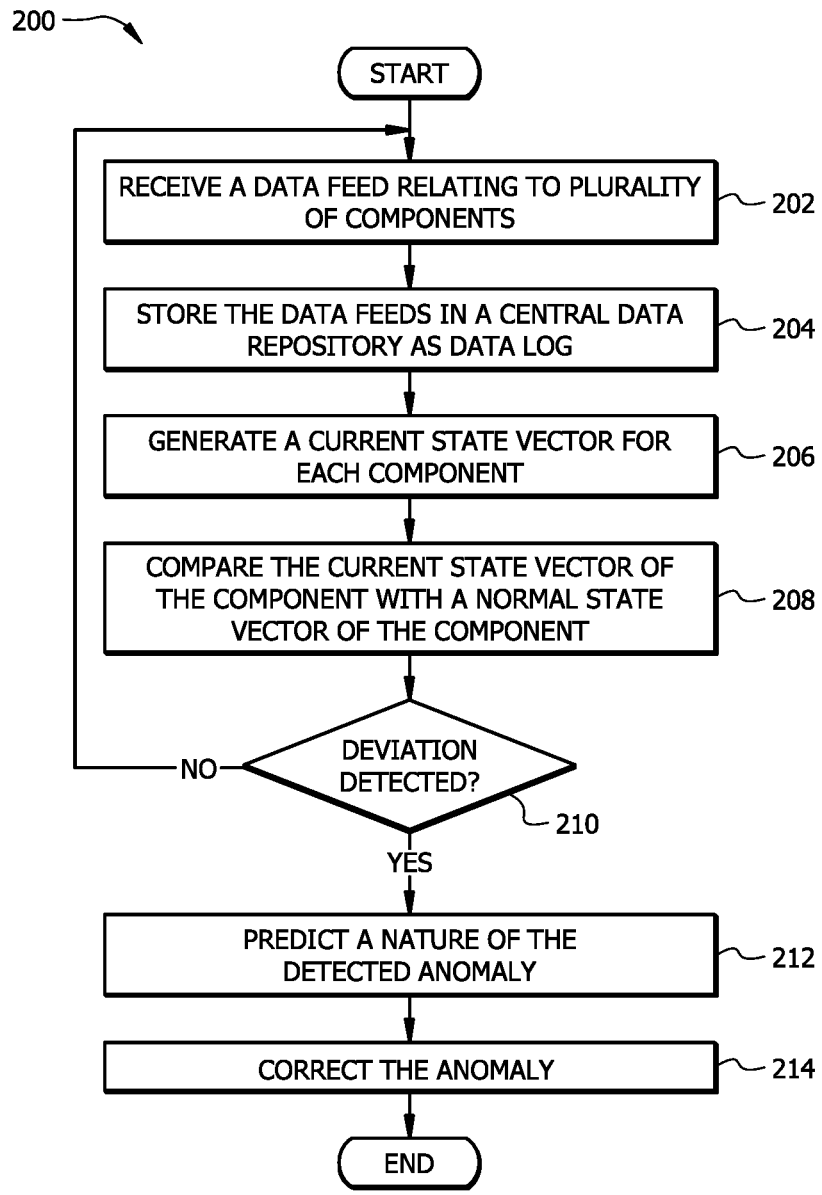
FIG. 2 is a flowchart of an example method for managing anomalies in a production computing environment, in accordance with one or more embodiments of the present disclosure.

FIG. 2 is a flowchart of an example method 200 for managing anomalies in a production computing environment 140, in accordance with one or more embodiments of the present disclosure. Method 200 may be performed by the anomaly manager 110 as shown in FIG. 1 and described above.

At operation 202, anomaly manager 110, receives a data feed 190 relating to one or more components 142 of the production computing environment 140, wherein the data feed 190 received for each component 142 includes information relating to performance of the component 142, wherein the plurality of components 142 includes at least one hardware component and at least one software component, wherein the at least one hardware component comprises a hardware device 144 and the at least one software component comprises a software application 146.

As described above, a data feed 190 may be generated (e.g., by anomaly manager 110 or one or more other computing devices of the production computing environment 140) for one or more components 142 of the production computing environment 140, wherein the data feed 190 relating to the components 142 include information relating to real-time or near real-time performance of the components 142. The data feed 190 relating to a component 142 may include information indicative of whether the component is operating normally and as expected. Performance related data may be generated for a plurality of software applications 146 and hardware devices 144. A data feed 190 may be generated for each component 142 including performance related data of the component 142. For example, performance related data generated for software applications 146 may include, but is not limited to, performance data relating to software applications being used by users of an organization that owns the production computing environment 140, performance data relating to software applications being used by external users to interact with the production computing environment 140 (e.g., at point of sale devices, ATMs, information kiosk devices etc.), performance data relating to operation of data centers used to store data (e.g., user data) in the production computing environment 140 and performance data relating to third-party software applications used but not owned by the organization. In one embodiment, the anomaly manager 110 (or one or more other computing devices) may run a software service tool that continually records performance logs for a software application 146 running in the production computing environment 140. The service tool may record several pre-configured events relating to the software application 146 including, but not limited to, information relating to logical exceptions, service errors, data access errors and other pre-configured exceptions and errors that may affect performance of the software application 146. A data feed 190 may be generated for each software application 146 based on the data log generated for the software application 146.

In one or more embodiments, performance related data may be generated for one or more hardware devices 144 using one or more hardware sensors. For example, one or more hardware sensors 145 may be provided that continually measure performance parameters associated with a hardware device 144. The performance parameters related of a hardware device 144 that can be measured by sensors 145 may include, but are not limited to, current, heat, voltage, power consumption, processing speed, vibrations and network speed. Each of the parameters measured for a hardware device 144 is indicative of a performance of the hardware device 144 at the time the parameter was measured. For example, large data centers typically have cooling towers that maintain the heat of electronic components at desired levels to ensure performance of the electronic components within specified parameters. In this context, a rise in the heat of the data center or a portion thereof beyond normal levels may indicate that the data center may not be operating within specified parameters. A data feed 190 may be generated for each hardware device 144 including values of the performance parameters as measured by one or more sensors 145.

At operation 204, anomaly manager 110 stores the data feed 190 received for each component 142 in a centralized data repository 150 as a data log 152.

As described above, data feed 190 generated for each component 142 may be transmitted to a central data repository 150. Central data repository 150 may include a centralized repository that may receive and store data feeds 190 relating to each of a plurality of components 142 operating in the production computing environment 140 as raw data logs 152. In this context, raw data log 152 may refer to data relating to a component 142 (e.g., hardware device 144 or software application 146) that has not been organized or formatted for further processing. Performance related data collected for several software applications 146 (e.g., by anomaly manager 110 or one or more other computing devices of the production computing environment 140) may be transmitted for storage to the central data repository 150. In one embodiment, IoT hub 180 may act as a central message hub that collects real-time performance metrics (e.g., measured parameter values measured by sensors 145)

for each hardware device 144 and transmits to the central data repository 150 a data feed 190 including the parameter values collected for each hardware device 144. The central data repository 150 may store the data received in the data feeds 190 from the IoT hub 180 as raw data logs 152 relating to the hardware devices 144.

At operation 206, anomaly manager 110 generates a current state vector 114 for each component 142 of the production computing environment 140 based on a respective data log 152 relating to the component 142, wherein the current state vector 114 represents a current performance of the component 142.

As described above, anomaly manager 110 may be configured to detect that an anomaly has occurred in relation to a component 142 of the production computing environment 140 based on the data log 152 of the component 142. Further, the anomaly manager 110 can be configured to predict the particular nature of the anomaly corresponding to the component 142. The particular nature of the anomaly may include one or more hardware or software issues causing the anomaly related to the component 142.

Anomaly manager 110 may be configured to generate a current state vector 114 for each component 142 of the production computing environment 140 based on the data log 152 of the component 142 as stored in the central data repository 150. The current state vector 114 generated for a component 142 represents a current (e.g., real time or near real time) performance of the component 142. To generate the current state vector 114 for a component 142, the anomaly manager 110 may be configured to first obtain (e.g., receive) the raw data logs 152 of components 142 from the central data repository 150. The anomaly manager 110 is configured to segregate the raw data stored in the raw data log 152 using a clustering and aggregation algorithm. Once the data in the data log 152 is segregated, the anomaly manager 110 is configured to extract from the segregated data log, data relating to the current performance of the component 142 and generate a current state vector 114 that is indicative of the current performance of the component 142. In an embodiment, the anomaly manager 110 is configured to generate the current state vector 114 for a component 142 based on the most recent performance data obtained for the component 142 from the data feeds 190 generated for the component 142, so that the current state vector 114 represents the most recent performance of the component 142. The anomaly manager 110 includes at least a portion of the performance related data of the component 142 (e.g., from the data log 152) in the current state vector 114 generated for the component 142. The performance related data included in the current state vector 114 of the component 142 may include real-time or near real-time data collected for the component 142.

In one example, anomaly manager 110 may extract from the central data repository 150, the most recent values of one or more performance related parameters for a hardware device 144. The anomaly manager 110 may generate a current state vector 114 for the hardware device 144 based on the data extracted from the central data repository 150, wherein the current state vector 114 may include the most recent values of one or more parameters that are indicative of the current performance of the hardware device 144. For example, the current state vector 114 may include values of parameters including, but not limited to, current, heat, voltage, power consumption, processing speed, network speed and vibrations. The values of the parameters included in the current state vector 114 may be indicative of the real-time or near real-time performance of the hardware device 144. Similarly, in one example, a current state vector 114 generated for a software application 146 may include at least a portion of the most recent data logs collected for the software application, including but not limited to, information relating to logical exceptions, service errors, data access errors and other pre-configured exceptions and errors that may affect performance of the software application 146. The data included in the current state vector 114 may be indicative of the real-time or near real-time performance of the software application 146.

Anomaly manager 110 may be configured to continually generate current state vectors 114 for each component 142 of the production computing environment 140 according to a pre-configured schedule (e.g., periodically after fixed time intervals), thus capturing the real-time or near real-time performance of each component 142.

At operation 208, anomaly manager 110 compares the current state vector 114 of the component 142 with a normal state vector of the component 142, wherein the normal state vector 112 represents normal performance of the component 142.

As described above, anomaly manager 110 may be configured to detect an anomaly associated with operation of a component 142 in the production computing environment 140. A detected anomaly relating to a component 142 may indicate that the component 142 may not be operating normally. Anomaly manager 110 may have access to a normal state vector 112 for each component 142, wherein the normal state vector 112 for a component 142 includes data indicative of normal performance of the component 142. Normal performance of a component 142 may include performance of the component 142 within specified parameters. For example, the normal state vector 112 of a hardware device 144 may include a value or range of values for each of one or more performance related parameters, wherein the value or range of values of a parameter equals or is within a normal range specified for the hardware device. For example, the normal state vector 112 for a hardware device 144 may include values of parameters including, but not limited to, current, heat, voltage, power consumption, processing speed, network speed and vibrations. In one embodiment, the normal parameter value ranges of hardware devices 144 are as defined by the individual device ratings. A normal state vector 112 for a software application 146 may include data logs relating to software application 146 that represent normal error-free operation of the software application 146. To determine whether an anomaly exists relating to a component 142, anomaly manager 110 compares the current state vector 114 of the component 142 with the normal state vector 112 of the component.

At operation 210, anomaly manager 110 checks whether the current state vector 114 generated for the component 142 deviates, at least in part, from the normal state vector 112 of the component 142. If a deviation is not detected, method 200 proceeds back to operation 202 where anomaly manager 110 continues to receive data feeds relating to components 142 and performs operations 204, 206 and 208 described above. However, if the current state vector 114 generated for the component 142 deviates, at least in part, from the normal state vector 112 of the component 142, method 200 proceeds to operation 212.

As described above, the anomaly manager 110 may be configured to detect that an anomaly exists in the operation of a component 142 when the current state vector 114 does not match, at least in part, with the normal state vector 112 of the component 142. For example, anomaly manager 110 may be configured to detect that an anomaly exists in the operation of a hardware device 144 when at least one value of a parameter included in the current state vector 114 of the hardware device 144 deviates from the corresponding value or range of values of the parameter included in the normal state vector 112 of the hardware device 144. For example, anomaly manager 110 determines that an anomaly exists in the operation of the hardware device 144 when the value of the parameter as included in the current state vector 114 is not within the normal range of values of the parameter as included in the normal state vector 112. Similarly, anomaly manager 110 may be configured to determine that an anomaly exists in the operation of a software application 146 when at least a portion of the data logs included in the current state vector 114 of the software application does not match with the corresponding data logs in the normal state vector 112 of the software application 146. In one or more embodiment, the anomaly manager 110 may be configured to continually (e.g., periodically or according to a pre-configured schedule) match the current state vector 114 of each component 142 as they are generated to the normal state vector 112 of the component 142. This helps the anomaly manager 110 to detect anomalies in operation of components 142 in real-time or near-real time.

At operation 212, anomaly manager 110 predicts an anomaly associated with the component 142 using an iterative machine learning method (e.g., using the iterative machine learning application 118) based at least on the data log 152 of the component 142 and the determined deviation. The iterative machine learning application 118 uses a plurality of machine learning models 120 to predict the anomaly and iteratively updates training of each of the machine learning models 120 using at least the most current data feed 190 received for the component.

As described above, when an anomaly is detected corresponding to a component 142 by the anomaly manager 110 (e.g., when the current state vector 114 deviates from the normal state vector 112), anomaly manager 110 may further be configured to determine a nature of the anomaly. In other words, the anomaly manager 110 may be configured to determine the particular software and/or hardware issue/error/fault that may be causing the current state vector 114 to deviate from the normal state vector 112. Anomaly manager 110 may be configured to use an iterative machine learning application 118 to identify and classify a detected anomaly relating to a component 142. To identify and classify an anomaly, the iterative machine learning application 118 may use data including but not limited to, data log 152 of the component 142, current state vector 114 generated for the component 142, normal state vector 112 of the component 142, results from the comparison of the current state vector 114 with the normal state vector 112 of the component 142 and information from failure repository 116 (including failure symptoms, corresponding hardware/software issues causing the failure symptoms and corrective actions to correct the anomaly).

The iterative machine learning application 118 may include using a plurality of machine learning models 120 that can independently classify an anomaly detected in relation to a component 142 and identify the nature of the detected anomaly. Identifying the nature of a detected anomaly may include identifying the hardware/software error or fault that may have caused the anomaly in the component 142. Each of the plurality of machine learning models 120 may use a different technique/algorithm to classify the detected anomaly relating to a component 142. Anomaly manager 110 may be configured to generate the plurality of machine learning models 120 and then use the generated models 120 to classify detected anomalies related to components 142. The iterative nature of the application 118 includes iteratively training each machine learning model 120 to classify anomalies related to a component 142 based on the most recent training dataset relating to the component 142. For example, anomaly manager 110 may be configured to re-train each machine learning model 120 to classify anomalies related to a component 142 based on the most recent training dataset relating to the component 142. The most recent training dataset relating to a component 142 may include, but is not limited to, the most recent data log 152 of the component 142 (e.g., obtained from the most recent data feed 190 for the component 142), the normal state vector 112 of the component 142, a current state vector generated for the component 142, the failure repository 116, results from previous comparisons of the current state vector 114 with the normal state vector 112 of the component 142, and results from previous classification of anomalies for the component 142. Anomaly manager 110 may be configured to re-train each machine learning model 120 based on a pre-configured schedule (e.g., periodically after fixed time intervals). In one embodiment, anomaly manager 110 may be configured to re-train one or more models 120 when a deviation is detected between the current state vector 114 and normal state vector 112 of a component 142. By iteratively updating the training of the machine learning models 120, anomaly manager 110 helps continually refine the models 120 and improve classification and prediction of the nature of identified anomalies.

When a potential anomaly is detected in the operation of a component 142 (e.g., based on comparison of the current state vector 114 and normal state vector 112 of the component 142), anomaly manager 110 may be configured to independent classify the detected anomaly using a plurality of the machine learning models 120. Anomaly manager 110 analyzes results of the classifying using the plurality of machine learning models 120 to determine which one of the models 120 predicted the nature of the anomaly with the highest accuracy. In one embodiment, anomaly manager 110 may compare an accuracy metric for each machine learning model 120 and determine which one of the machine learning models 120 has the highest accuracy metric. The accuracy metric is indicative of an accuracy of anomaly prediction made by a particular machine learning model 120, wherein a higher accuracy metric corresponds to a higher accuracy of anomaly prediction. Anomaly manager 110 selects the machine learning model 120 having the highest associated accuracy metric and designates the anomaly predicted by the selected model 120 as the predicted nature of the anomaly associated with the detected anomaly. By continually re-training the models 120, independently classifying a detected anomaly using several models 120 and selecting the anomaly predicted by a model 120 having the highest accuracy, allows the anomaly manager 110 to predict the nature of detected anomalies with high accuracy. A predicted nature of an anomaly may include a failure of or error in a hardware device 144, an error in a software application, or a combination thereof.

In one or more embodiments, anomaly manager 110 be configured to update the normal state vector 112 of a component 142 based on results of predicting a nature of a detected anomaly based on the iterative machine learning application. For example, when a deviation is detected between a current state vector 114 generated for a component 142 and the normal state vector 112 of the component, anomaly manager 110 may classify the detected anomaly as described above based on the iterative machine learning application 118. However, after running the plurality of machine learning models 120 and analyzing the results of the models 120, anomaly manager 110 may determine that no hardware/software fault exists in the component 142. In response, anomaly manager 110 may add at least a portion of data from the current state vector 114 to the normal state vector 112, so that when performance related data similar to what is included in the current state vector 114 is subsequently obtained for the component 142, anomaly manager 110 may not again detect a deviation/anomaly. For example, when a measured current value relating to a hardware device 144 as included in the current state vector 114 for the hardware device 144 deviates from the normal range of current values included in the normal state vector 112 of the hardware device 144, anomaly manager 110 may not detect a hardware/software fault causing the deviation. Consequently, anomaly manager 110 may add the measured current value as a normal current value in the normal state vector 112 of the hardware device 144. Accordingly, when the same current value is subsequently measured for the hardware device, anomaly manager 110 may not detect a deviation from the normal state vector 112 and may not raise a flag to predict a hardware/software fault.

In certain embodiments, one or more of the plurality of machine learning models 120 may be designed to predict anomalies for certain types of components 142 or individual components 142. Anomaly manager 110 may select multiple models 120 from the plurality of models 120 based on the component 142 for which an anomaly/deviation was detected. For example, the data feed 190 relating to a component 142 may include an indicator of whether the data in the data feed 190 corresponds to a hardware device 144 or a software application 146. Anomaly manager 110 may select models 120 to predict a nature of a detect anomaly relating to a component 142 based on whether the component 142 is a hardware device 144 or a software application 146.

At operation 214, anomaly manager 110 corrects the predicted anomaly related to the component 142 by taking at least one pre-configured action corresponding to the predicted anomaly.

Once a nature of a detected anomaly (e.g., a hardware/software fault or error) relating to a component 142 has been predicted, anomaly manager 110 may be configured to automatically identify a corrective action corresponding to the predicted anomaly and further automatically perform the identified corrective action to correct the anomaly to resume normal operation of the component 142 and to avoid system downtime caused by the faulty component 142. Anomaly manager 110 may have access to a failure repository 116 that includes a list of failure symptoms, known hardware/software faults causing those failure symptoms and one or more corrective actions corresponding to each hardware/software fault. A set of failure symptoms in the failure repository 116 may correspond to a detected anomaly or deviation as described above of the current state vector 114 from the normal state vector 112 for a component 142, and a corresponding hardware/software fault may correspond to the predicted nature of the detected anomaly that may be causing the deviation. Thus, for every predicted anomaly that corresponds to a known hardware/software fault listed in the failure repository 116, a respective corrective action may be provided in the failure repository 116 to correct the hardware/software fault.

Anomaly manager 110 may be configured to search the failure repository 116 for a hardware/software fault corresponding to a predicted anomaly relating to a component 142 and identify one or more corrective actions that may correct the anomaly and restore the component 142 to a normal operation. The failure repository 116 may include several types of faults and corresponding corrective actions. For example, when the fault includes an error or failure in a hardware device 144, the corresponding corrective action may include switching to an alternative hardware device 144, sending a command to the hardware device 144 to rectify signals associated with the hardware device, switching operation of the hardware device 144 to a cloud instance or resetting the hardware device 144 to an original factory setting. When the anomaly includes a logical error associated with a software application 146, the corrective action may include resetting the software application 146 to an original factory setting, switching the software application to a cloud instance or applying a pre-configured software patch to correct the logical error. When the fault includes a data breach associated with a software application 146, the corrective action may include transmitting a message to an administrator responsible for system security. When the fault includes an error associated with accessing a software application 146, the corrective action may include checking access level of an accessing user or entity and initiating access correction. It may be noted that the above discussed examples of faults and respective corrective actions is not an exhaustive list and that a person having ordinary skill in the art can appreciate that there may be other types of faults that can cause anomalous behavior within the production computing environment 140 and respective corrective actions that may be performed to correct the anomalous behavior.

Figure 3:
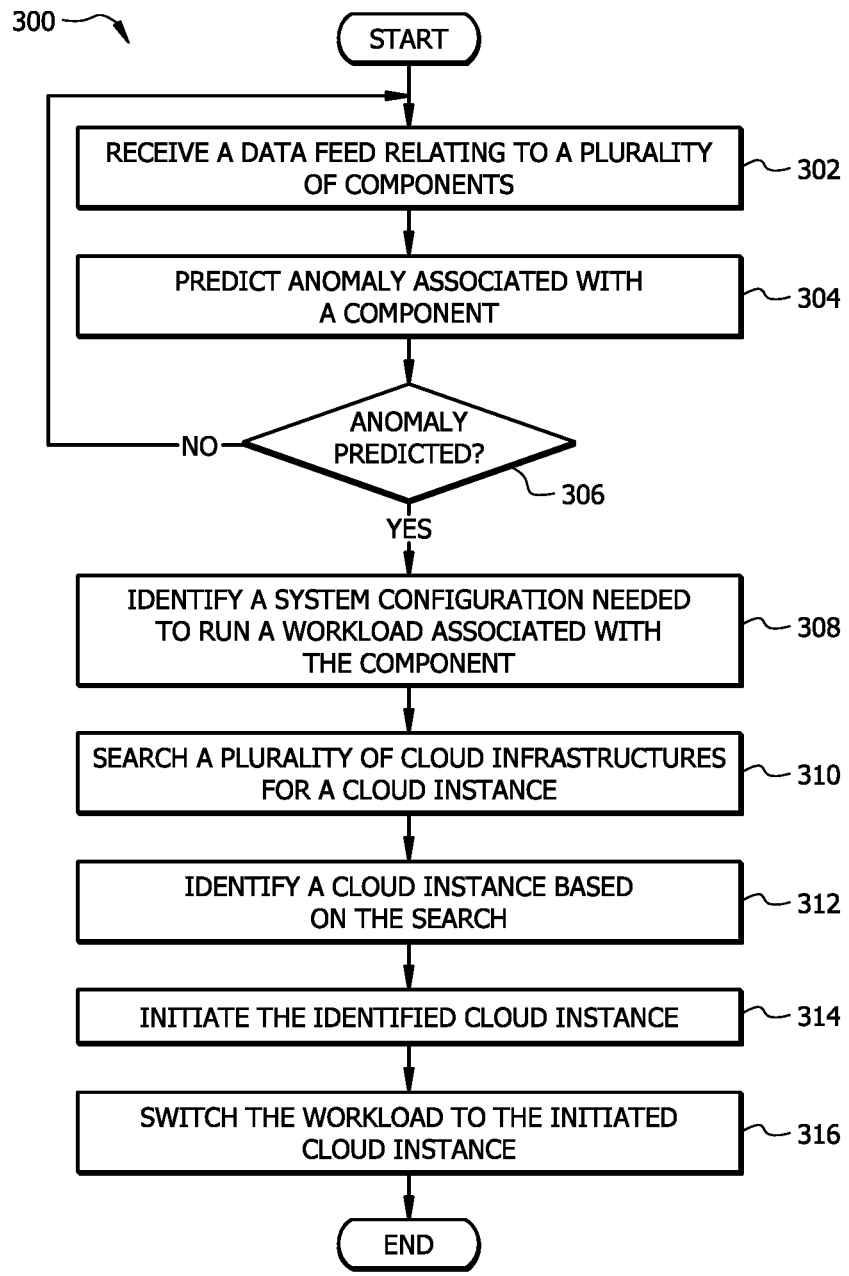
FIG. 3 is a flowchart of an example method for managing anomalies in a production computing environment to avoid service interruption, in accordance with one or more embodiments of the present disclosure.

FIG. 3 is a flowchart of an example method 300 for managing anomalies in a production computing environment 140 to avoid service interruption, in accordance with one or more embodiments of the present disclosure. Method 300 may be performed by the anomaly manager 110 as shown in FIG. 1 and described above.

At operation 302, anomaly manager 110 receives a data feed 190 relating to one or more components 142 of the production computing environment 140, wherein the data feed 190 received for each component 142 includes information relating to performance of the component 142, wherein the plurality of components 142 includes at least one hardware component and at least one software component, wherein the at least one hardware component comprises a hardware device 144 and the at least one software component comprises a software application 146.

As described above, a data feed 190 may be generated (e.g., by anomaly manager 110 or one or more other computing devices of the production computing environment 140) for one or more components 142 of the production computing environment 140, wherein the data feed 190 relating to the components 142 include information relating to real-time or near real-time performance of the components 142. The data feed 190 relating to a component 142 may include information indicative of whether the component is operating normally and as expected. Performance related data may be generated for a plurality of software applications 146 and hardware devices 144. A data feed 190 may be generated for each component 142 including performance related data of the component 142. For example, performance related data generated for software applications 146 may include, but is not limited to, performance data relating to software applications being used by users of an organization that owns the production computing environment 140, performance data relating to software applications being used by external users to interact with the production computing environment 140 (e.g., at point of sale devices, ATMs, information kiosk devices etc.), performance data relating to operation of data centers used to store data (e.g., user data) in the production computing environment 140 and performance data relating to third-party software applications used but not owned by the organization. In one embodiment, the anomaly manager 110 (or one or more other computing devices) may run a software service tool that continually records performance logs for a software application 146 running in the production computing environment 140. The service tool may record several pre-configured events relating to the software application 146 including, but not limited to, information relating to logical exceptions, service errors, data access errors and other pre-configured exceptions and errors that may affect performance of the software application 146. A data feed 190 may be generated for each software application 146 based on the data log generated for the software application 146.

In one or more embodiments, performance related data may be generated for one or more hardware devices 144 using one or more hardware sensors. For example, one or more hardware sensors 145 may be provided that continually measure performance parameters associated with a hardware device 144. The performance parameters related of a hardware device 144 that can be measured by sensors 145 may include, but are not limited to, current, heat, voltage, power consumption, processing speed, vibrations and network speed. Each of the parameters measured for a hardware device 144 is indicative of a performance of the hardware device 144 at the time the parameter was measured. For example, large data centers typically have cooling towers that maintain the heat of electronic components at desired levels to ensure performance of the electronic components within specified parameters. In this context, a rise in the heat of the data center or a portion thereof beyond normal levels may indicate that the data center may not be operating within specified parameters. A data feed 190 may be generated for each hardware device 144 including values of the performance parameters as measured by one or more sensors 145.

Data feed 190 generated for each component 142 may be transmitted to a central data repository 150. Central data repository 150 may include a centralized repository that may receive and store data feeds 190 relating to each of a plurality of components 142 operating in the production computing environment 140 as raw data logs 152. In this context, raw data log 152 may refer to data relating to a component 142 (e.g., hardware device 144 or software application 146) that has not been organized or formatted for further processing. Performance related data collected for several software applications 146 (e.g., by anomaly manager 110 or one or more other computing devices of the production computing environment 140) may be transmitted for storage to the central data repository 150. In one embodiment, IoT hub 180 may act as a central message hub that collects real-time performance metrics (e.g., measured parameter values measured by sensors 145) for each hardware device 144 and transmits to the central data repository 150 a data feed 190 including the parameter values collected for each hardware device 144. The central data repository 150 may store the data received in the data feeds 190 from the IoT hub 180 as raw data logs 152 relating to the hardware devices 144.

At operation 304, anomaly manager 110 predicts an anomaly associated with a component 142 of the plurality of components based on the data feed relating to the component.

As described above, anomaly manager 110 may be configured to detect that an anomaly has occurred in relation to a component 142 of the production computing environment 140 based on the data log 152 of the component 142. Further, the anomaly manager 110 can be configured to predict the particular nature of the anomaly corresponding to the component 142. The particular nature of the anomaly may include one or more hardware or software issues causing the anomaly related to the component 142.

Anomaly manager 110 may be configured to generate a current state vector 114 for each component 142 of the production computing environment 140 based on the data log 152 of the component 142 as stored in the central data repository 150. The current state vector 114 generated for a component 142 represents a current (e.g., real time or near real time) performance of the component 142. To generate the current state vector 114 for a component 142, the anomaly manager 110 may be configured to first obtain (e.g., receive) the raw data logs 152 of components 142 from the central data repository 150. The anomaly manager 110 is configured to segregate the raw data stored in the raw data log 152 using a clustering and aggregation algorithm. Once the data in the data log 152 is segregated, the anomaly manager 110 is configured to extract from the segregated data log, data relating to the current performance of the component 142 and generate a current state vector 114 that is indicative of the current performance of the component 142. In an embodiment, the anomaly manager 110 is configured to generate the current state vector 114 for a component 142 based on the most recent performance data obtained for the component 142 from the data feeds 190 generated for the component 142, so that the current state vector 114 represents the most recent performance of the component 142. The anomaly manager 110 includes at least a portion of the performance related data of the component 142 (e.g., from the data log 152) in the current state vector 114 generated for the component 142. The performance related data included in the current state vector 114 of the component 142 may include real-time or near real-time data collected for the component 142.

In one example, anomaly manager 110 may extract from the central data repository 150, the most recent values of one or more performance related parameters for a hardware device 144. The anomaly manager 110 may generate a current state vector 114 for the hardware device 144 based on the data extracted from the central data repository 150, wherein the current state vector 114 may include the most recent values of one or more parameters that are indicative of the current performance of the hardware device 144. For example, the current state vector 114 may include values of parameters including, but not limited to, current, heat, voltage, power consumption, processing speed, network speed and vibrations. The values of the parameters included in the current state vector 114 may be indicative of the real-time or near real-time performance of the hardware device 144. Similarly, in one example, a current state vector 114 generated for a software application 146 may include at least a portion of the most recent data logs collected for the software application, including but not limited to, information relating to logical exceptions, service errors, data access errors and other pre-configured exceptions and errors that may affect performance of the software application 146. The data included in the current state vector 114 may be indicative of the real-time or near real-time performance of the software application 146.

Anomaly manager 110 may be configured to continually generate current state vectors 114 for each component 142 of the production computing environment 140 according to a pre-configured schedule (e.g., periodically after fixed time intervals), thus capturing the real-time or near real-time performance of each component 142.

Anomaly manager 110 may be configured to detect an anomaly associated with operation of a component 142 in the production computing environment 140. A detected anomaly relating to a component 142 may indicate that the component 142 may not be operating normally. Anomaly manager 110 may have access to a normal state vector 112 for each component 142, wherein the normal state vector 112 for a component 142 includes data indicative of normal performance of the component 142. Normal performance of a component 142 may include performance of the component 142 within specified parameters. For example, the normal state vector 112 of a hardware device 144 may include a value or range of values for each of one or more performance related parameters, wherein the value or range of values of a parameter equals or is within a normal range specified for the hardware device. For example, the normal state vector 112 for a hardware device 144 may include values of parameters including, but not limited to, current, heat, voltage, power consumption, processing speed, network speed and vibrations. In one embodiment, the normal parameter value ranges of hardware devices 144 are as defined by the individual device ratings. A normal state vector 112 for a software application 146 may include data logs relating to software application 146 that represent normal error-free operation of the software application 146. To determine whether an anomaly exists relating to a component 142, anomaly manager 110 compares the current state vector 114 of the component 142 with the normal state vector 112 of the component.

Anomaly manager 110 may be configured to detect that an anomaly exists in the operation of a component 142 when the current state vector 114 does not match, at least in part, with the normal state vector 112 of the component 142. For example, anomaly manager 110 may be configured to detect that an anomaly exists in the operation of a hardware device 144 when at least one value of a parameter included in the current state vector 114 of the hardware device 144 deviates from the corresponding value or range of values of the parameter included in the normal state vector 112 of the hardware device 144. For example, anomaly manager 110 determines that an anomaly exists in the operation of the hardware device 144 when the value of the parameter as included in the current state vector 114 is not within the normal range of values of the parameter as included in the normal state vector 112. Similarly, anomaly manager 110 may be configured to determine that an anomaly exists in the operation of a software application 146 when at least a portion of the data logs included in the current state vector 114 of the software application does not match with the corresponding data logs in the normal state vector 112 of the software application 146. In one or more embodiments, the anomaly manager 110 may be configured to continually (e.g., periodically or according to a pre-configured schedule) match the current state vector 114 of each component 142 as they are generated to the normal state vector 112 of the component 142. This helps the anomaly manager 110 to detect anomalies in operation of components 142 in real-time or near-real time.

When an anomaly is detected corresponding to a component 142 by the anomaly manager 110 (e.g., when the current state vector 114 deviates from the normal state vector 112), anomaly manager 110 may further be configured to determine a nature of the anomaly. In other words, the anomaly manager 110 may be configured to determine the particular software and/or hardware issue/error/fault that may be causing the current state vector 114 to deviate from the normal state vector 112. Anomaly manager 110 may be configured to use an iterative machine learning application 118 to identify and classify a detected anomaly relating to a component 142. To identify and classify an anomaly, the iterative machine learning application 118 may use data including but not limited to, data log 152 of the component 142, current state vector 114 generated for the component 142, normal state vector 112 of the component 142, results from the comparison of the current state vector 114 with the normal state vector 112 of the component 142 and information from failure repository 116 (including failure symptoms, corresponding hardware/software issues causing the failure symptoms and corrective actions to correct the anomaly).

The iterative machine learning application 118 may include using a plurality of machine learning models 120 that can independently classify an anomaly detected in relation to a component 142 and identify the nature of the detected anomaly. Identifying the nature of a detected anomaly may include identifying the hardware/software error or fault that may have caused the anomaly in the component 142. Each of the plurality of machine learning models 120 may use a different technique/algorithm to classify the detected anomaly relating to a component 142. Anomaly manager 110 may be configured to generate the plurality of machine learning models 120 and then use the generated models 120 to classify detected anomalies related to components 142. The iterative nature of the application 118 includes iteratively training each machine learning model 120 to classify anomalies related to a component 142 based on the most recent training dataset relating to the component 142. For example, anomaly manager 110 may be configured to re-train each machine learning model 120 to classify anomalies related to a component 142 based on the most recent training dataset relating to the component 142. The most recent training dataset relating to a component 142 may include, but is not limited to, the most recent data log 152 of the component 142 (e.g., obtained from the most recent data feed 190 for the component 142), the normal state vector 112 of the component 142, a current state vector generated for the component 142, the failure repository 116, results from previous comparisons of the current state vector 114 with the normal state vector 112 of the component 142, and results from previous classification of anomalies for the component 142. Anomaly manager 110 may be configured to re-train each machine learning model 120 based on a pre-configured schedule (e.g., periodically after fixed time intervals). In one embodiment, anomaly manager 110 may be configured to re-train one or more models 120 when a deviation is detected between the current state vector 114 and normal state vector 112 of a component 142. By iteratively updating the training of the machine learning models 120, anomaly manager 110 helps continually refine the models 120 and improve classification and prediction of the nature of identified anomalies.

When a potential anomaly is detected in the operation of a component 142 (e.g., based on comparison of the current state vector 114 and normal state vector 112 of the component 142), anomaly manager 110 may be configured to independent classify the detected anomaly using a plurality of the machine learning models 120. Anomaly manager 110 analyzes results of the classifying using the plurality of machine learning models 120 to determine which one of the models 120 predicted the nature of the anomaly with the highest accuracy. In one embodiment, anomaly manager 110 may compare an accuracy metric for each machine learning model 120 and determine which one of the machine learning models 120 has the highest accuracy metric. The accuracy metric is indicative of an accuracy of anomaly prediction made by a particular machine learning model 120, wherein a higher accuracy metric corresponds to a higher accuracy of anomaly prediction. Anomaly manager 110 selects the machine learning model 120 having the highest associated accuracy metric and designates the anomaly predicted by the selected model 120 as the predicted nature of the anomaly associated with the detected anomaly. By continually retraining the models 120, independently classifying a detected anomaly using several models 120 and selecting the anomaly predicted by a model 120 having the highest accuracy, allows the anomaly manager 110 to predict the nature of detected anomalies with high accuracy. A predicted nature of an anomaly may include a failure of or error in a hardware device 144, an error in a software application, or a combination thereof.

In one or more embodiments, anomaly manager 110 be configured to update the normal state vector 112 of a component 142 based on results of predicting a nature of a detected anomaly based on the iterative machine learning application. For example, when a deviation is detected between a current state vector 114 generated for a component 142 and the normal state vector 112 of the component, anomaly manager 110 may classify the detected anomaly as described above based on the iterative machine learning application 118. However, after running the plurality of machine learning models 120 and analyzing the results of the models 120, anomaly manager 110 may determine that no hardware/software fault exists in the component 142. In response, anomaly manager 110 may add at least a portion of data from the current state vector 114 to the normal state vector 112, so that when performance related data similar to what is included in the current state vector 114 is subsequently obtained for the component 142, anomaly manager 110 may not again detect a deviation/anomaly. For example, when a measured current value relating to a hardware device 144 as included in the current state vector 114 for the hardware device 144 deviates from the normal range of current values included in the normal state vector 112 of the hardware device 144, anomaly manager 110 may not detect a hardware/software fault causing the deviation. Consequently, anomaly manager 110 may add the measured current value as a normal current value in the normal state vector 112 of the hardware device 144. Accordingly, when the same current value is subsequently measured for the hardware device, anomaly manager 110 may not detect a deviation from the normal state vector 112 and may not raise a flag to predict a hardware/software fault.

In certain embodiments, one or more of the plurality of machine learning models 120 may be designed to predict anomalies for certain types of components 142 or individual components 142. Anomaly manager 110 may select multiple models 120 from the plurality of models 120 based on the component 142 for which an anomaly/deviation was detected. For example, the data feed 190 relating to a component 142 may include an indicator of whether the data in the data feed 190 corresponds to a hardware device 144 or a software application 146. Anomaly manager 110 may select models 120 to predict a nature of a detect anomaly relating to a component 142 based on whether the component 142 is a hardware device 144 or a software application 146.

At operation 306, anomaly manager 110 determines whether an anomaly/fault (e.g., hardware or software fault causing the deviation) was successfully predicted. If the anomaly was not successfully predicted method 300 moves back to operation 302 where anomaly manager 110 continues to receive data feeds 190 relating to each component 142 and attempts to predict an anomaly relating to the component based on the most recent data feed of the component 142. However, if an anomaly was successfully predicted, method 300 proceeds to operation 308.

At operation 308, anomaly manager 110 identifies a system configuration 122 needed to run a current workload associated with the component 142.

As described above, in some cases, when a component 142 behaves in an anomalous manner, the anomalous behavior may cause partial or total service interruption in the production computing environment 140. Anomaly manager 110 may be configured to identify and correct the anomalous behavior within the production computing environment 140 in a way that avoids or eliminates any system downtime that may be caused by the anomalous behavior. Production computing environment 140 may include a cloud stack 160 having a plurality of cloud infrastructures (shown as 162, 164 and 166). It may be noted that cloud stack 160 is shown to include three cloud infrastructures 162-166 for exemplary purpose and for ease of illustration, and that cloud stack 160 may include less than three or more than three cloud infrastructures. Each of the cloud infrastructures 162-166 may be communicatively coupled to one or more other devices in system 100 (e.g., anomaly manager 110 and/or one or more components 142 of the production computing environment 140), for example, via network 170. Each cloud infrastructure 162-166 may include a set of one or more hardware resources and software resources. In this context a hardware resource may include but is not limited to, a processor, a memory device, a server, a database, or any other hardware device, machine or component that can replace or perform the function of one or more hardware devices 144 in the production computing environment 140. A software resource may include, but is not limited to, a software program or application such as an operating system, user interface or other customized software that can implement one or more functionalities performed by software applications 146 in the production computing environment 140. Each of the cloud infrastructures 162-166 may provide pre-configured cloud instances 168, wherein each cloud instance 168 of a cloud infrastructure includes a unique set of hardware and/or software resources. In cloud computing, a cloud instance 168 generally refers to a virtual machine that uses one or more hardware and/or software resources of a cloud infrastructure to run a workload. The term "workload" generally refers to an application or service deployed using a computing machine (e.g., virtual machine) that consumes resources such as computing power and memory. In addition to the pre-configured cloud instances 168, one or more of the cloud infrastructures 162-166 may allow customized cloud instances to be created to cater to customized needs. In one embodiment, each cloud infrastructure 162-166 may be provided by a different cloud vendor.

Anomaly manager 110 may be configured to switch (e.g., at least temporarily) at least a portion of a workload from a current system in the production computing environment 140 to one or more cloud instances of a cloud infrastructure 162-166 to avoid service interruption in the production computing environment 140. For example, when an anomalous behavior in a component 142 of the production computing environment 140 may cause partial or total service interruption, anomaly manager 110 may be configured to switch at least a portion of the workload running on an original computing device or system of the production computing environment 140 to a cloud instance 168 of one of the cloud infrastructures 162-166. Switching the workload to a cloud instance 168 may include switching one or more software applications 146 running using the original machine or system to the cloud instance 168. In one embodiment, switching the workload may include switching a software application 146 behaving anomalously along with one more other software applications 146 affected by the anomalous behavior. Switching the workload to the cloud instance 168 may avoid service interruption that may be caused due to the anomalous behavior of the component 142. For example, when an anomaly is detected relating to a processor running at least a portion of the workload in the production computing environment 140, anomaly manager 110 may switch the portion of the workload currently run by the processor to a cloud instance 168 so that the portion of the workload is run in the cloud instance using cloud resources. This avoids the anomalous processor from causing partial or total service interruption. Further, switching the workload or a portion thereof to a cloud instance 168 provides an opportunity to take one or more corrective actions to correct a detected anomaly in the production computing environment 140 without any system downtime that may cause service interruption within the production computing environment 140. In one embodiment, only a portion of the workload affected by the anomalous behavior of a component 142 may be switched to an appropriate cloud instance 168, while continuing to run a remaining portion of the workload using computing systems of the production computing environment 140.

At operation 310, anomaly manager 110 searches each of the plurality of cloud infrastructures 162-166 for a cloud instance 168 that can support the identified system configuration 122.

As described above, anomaly manager 110 may be configured to search each of the cloud infrastructures 162-166 for a cloud instance 168 having configuration that can support the workload that is to be switched from an original system in the production computing environment 140. In this context, the term "configuration" may refer to hardware resource (e.g., processors, memory devices, databases, serves etc.), software resources (e.g., operating systems, user interfaces, third party software etc.) or a combination thereof. When an anomaly related to a component 142 is identified and predicted as described above, anomaly manager 110 identifies a workload running in the production computing environment 140 that can be affected by the identified anomaly in the component 142 and further identifies a system configuration 122 needed to support the workload. The identified workload may include one or more software applications 146 and the identified system configuration 122 may include one or more hardware resources, one or more software resource or a combination thereof. After identifying the system configuration 122 needed to run the identified workload, anomaly manager 110 may be configured to search each of the plurality of cloud infrastructures 162-166 for a cloud instance 168 that can support the identified system configuration 122. For example, anomaly manager 110 may search for a cloud instance 168 that includes at least a minimum amount of hardware and/or software resources needed to support the identified system configuration 122 and run the identified workload. In one embodiment, a vendor of each of the cloud infrastructure 162-166 may provide access to information relating configurations of all cloud instances 168 provided by the cloud infrastructure 162-166. Anomaly manager 110 may access and search the provided information for each cloud infrastructure 162-166 to identify the required cloud instance 168.

At operation 312, anomaly manager 110 identifies based on the search a cloud instance 168 of a cloud infrastructure 162-166 that can support the identified system configuration 122. As described above, as a result of searching information relating to configuration of the cloud instances 168 provided by the plurality of cloud infrastructures 162-166, anomaly manager 110 may identify at least one cloud instance 168 of a corresponding cloud infrastructure 162-166 that can support the identified system configuration 122.

At operation 314, anomaly manager 110 initiates the identified cloud instance 168 of the cloud infrastructure 162-166 by creating in the cloud infrastructure 162-166 a virtual machine corresponding to the identified cloud instance 168.

At operation 316, anomaly manager 110 switches the workload from an original system running the workload to the initiated cloud instance 168.

As described above, anomaly manager 110 may initiate an identified cloud instance 168 and switch the identified workload from the original system in the production computing environment 140 to the identified cloud instance 168. Initiating the identified cloud instance 168 may include creating in the cloud infrastructure a virtual machine corresponding to the identified cloud instance.

In some cases, anomaly manager 110 may identify more than one cloud instance 168 that can support the system configuration 122, wherein at least two of the identified cloud instances 168 may be provided by different cloud infrastructures managed by different cloud vendors. In such cases, anomaly manager 110 may be configured to select a most cost-effective cloud instance 168 among the identified cloud instances 168 that can support the system configuration 122. Each cloud vendor may provide the anomaly manager 110 access to information including pricing associated with the cloud instances 168 provided by a respective cloud infrastructure 162-166. Anomaly manager 110 may be configured to search the information to determine the pricing associated with each identified cloud instance 168 that can support the system configuration 122. Anomaly manager 110 may be configured to select a cloud instance 168 that is associated with the lowest pricing among the plurality of identified cloud instances 168. Once the most cost-effective cloud instance 168 is selected, anomaly manager 110 may be configured to transfer the identified workload to the selected cloud instance 168.

Anomaly manager 110 may be configured to temporarily switch the workload to a cloud instance 168 as described above, and to switch back the workload back to the original computing system of the production computing environment 140 when the anomaly identified in the production computing environment 140 has been corrected. For example, when an anomaly is detected relating to a processor running at least a portion of the workload in the production computing environment 140, anomaly manager 110 may switch the portion of the workload currently run by the processor to a cloud instance 168 so that the portion of the workload is run in the cloud instance 168 using cloud resources. After the workload has been switched to the cloud instance 168, anomaly manager 110 may perform one or more corrective actions to correct the anomaly. When the anomaly has been corrected and the original system is operating normally, anomaly manager 110 may switch back the workload to the original system, thus restoring the production environment to full operation.

In one or more embodiments, anomaly manager 110 may use quantum computing to perform at least a portion of the operations described above. Large production computing environments may have several hundred or even thousands of components 142 generating huge amounts of performance related data. In order to identify an anomaly associated with a component of the production computing environment 140 in real time or near real time, all the data generated for the components 142 needs to be processed very quickly. Quantum computing may be used to process data in real time or near real time so that anomalies are identified in real time and corrective actions are taken before any service interruption occurs. For example, anomaly manager 110 may use quantum processors running one or more quantum bots to perform operations described above including, but not limited to, generating current state vectors 114 based on real time data logs of components 142, detecting an anomaly related to a component 142 based on comparison of the current state vector 114 and normal state vector 112 of the component, predicting a nature of the detected anomaly using the iterative machine learning application 118, identifying a cost-effective cloud instance for transferring a workload from the production computing environment 140 and identifying and performing corrective actions to correct identified anomalies in the production computing environment 140.

Figure 4:
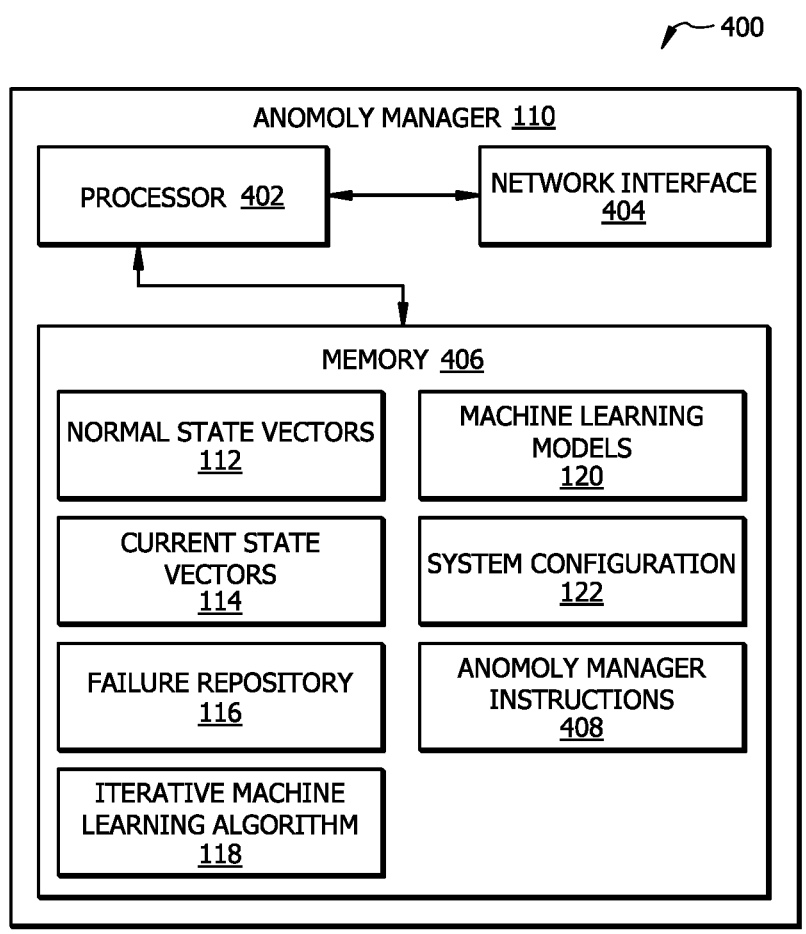
FIG. 4 illustrates an example schematic diagram of the anomaly manager illustrated in FIG. 1, in accordance with one or more embodiments of the present disclosure.

FIG. 4 illustrates an example schematic diagram 400 of the anomaly manager 110 illustrated in FIG. 1, in accordance with one or more embodiments of the present disclosure.

Anomaly manager 110 includes a processor 402, a memory 406, and a network interface 404. The anomaly manager 110 may be configured as shown in FIG. 4 or in any other suitable configuration.

The processor 402 comprises one or more processors operably coupled to the memory 406. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 406. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., anomaly manager instructions 408) to implement the anomaly manager 110. In this way, processor 402 may be a special-purpose computer designed to implement the functions disclosed herein. In one or more embodiments, the anomaly manager 110 is implemented using logic units, FPGAs, ASICs, DSPs, or any other suitable hardware. The anomaly manager 110 is configured to operate as described with reference to FIGS. 1-3. For example, the processor 402 may be configured to perform at least a portion of the methods 200 and 300 as described in FIGS. 2 and 3 respectively.

The memory 406 comprises one or more disks, tape drives, or solid-state drives, and may be used as an over-flow data storage device, to store programs when such programs are selected for execution, and to store instructions and data that are read during program execution. The memory 406 may be volatile or non-volatile and may comprise a read-only memory (ROM), random-access memory (RAM), ternary content-addressable memory (TCAM), dynamic random-access memory (DRAM), and static random-access memory (SRAM).

The memory 406 is operable to store the normal state vectors 112, current state vectors 114, failure repository 116, iterative machine learning application 118 (including the machine learning models 120), system configuration 122 and the anomaly manager instructions 408. The anomaly manager instructions 408 may include any suitable set of instructions, logic, rules, or code operable to execute the anomaly manager 110.

The network interface 404 is configured to enable wired and/or wireless communications. The network interface 404 is configured to communicate data between the anomaly manager 110 and other devices, systems, or domains (e.g. components 142 of the production computing environment 140, central data repository 150, cloud infrastructures 162-166, IOT hub 180 etc.). For example, the network interface 404 may comprise a Wi-Fi interface, a LAN interface, a WAN interface, a modem, a switch, or a router. The processor 402 is configured to send and receive data using the network interface 404. The network interface 404 may be configured to use any suitable type of communication protocol as would be appreciated by one of ordinary skill in the art.

It may be noted that each of the production computing environment, IOT hub 180 and central data repository 150 may be implemented similar to the anomaly manager 110. For example, the production computing environment, IOT hub 180 and central data repository 150 may include a processor and a memory storing instructions to implement the respective functionality when executed by the processor.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a production computing environment comprising a plurality of components including at least one hardware component and at least one software component, wherein the at least one hardware component comprises a hardware device and the at least one software component comprises a software application; and
a centralized data repository that receives and stores a data feed relating to one or more of the plurality of components as a data log and wherein the data feed received for each component includes information relating to performance of the component;
at least one processor communicatively coupled to the centralized data repository and configured to:
obtain from the centralized data repository, the data log relating to the one or more components;
for each component:
generate a current state vector based on the respective data log relating to the component, wherein the current state vector represents a current performance of the component;
compare the current state vector of the component with a normal state vector of the component, wherein the normal state vector represents normal performance of the component;
determine that the current state vector of the component deviates, at least in part, from the normal state vector of the component;
in response to detecting the deviation, predict an anomaly associated with the component using an iterative machine learning method based at least on the data log of the component and the determined deviation, wherein the iterative machine learning method uses a plurality of machine learning models to predict the anomaly and iteratively updates training of each of the machine learning models using at least the most current data feed received for the component;
identify a system configuration needed to run a current workload associated with the component, wherein the current workload includes processing at least one software application;
search each of a plurality of cloud infrastructures for a cloud instance that can support the identified system configuration;
identify, based on the search, a cloud instance of a cloud infrastructure that can support the identified system configuration;
switch the current workload from an original system running the current workload to the identified cloud instance;
correct the anomaly by taking at least one pre-configured action corresponding to the predicted anomaly; and
after correcting the anomaly, switch back the current workload from the identified cloud instance to the original system.

2. The system of claim 1, wherein the at least one processor predicts the anomaly associated with the component by:
generating the plurality of machine learning models, wherein each machine learning model uses a different algorithm to predict an anomaly associated with the component;
predicting an anomaly using each of the plurality of machine learning models based at least on the most recent data feed received from the component;
comparing results from the predicting the anomaly using each of the plurality of machine learning models;
selecting, based on the results, one of the machine learning models having a highest accuracy associated with the prediction of the anomaly; and
selecting the anomaly predicted by the selected machine learning model as the predicted anomaly of component.

3. The system of claim 1, wherein the at least one processor is further configured to iteratively update training of each of the machine learning models for predicting the anomaly corresponding to the component by:
at each iteration:
generate a training dataset for the machine learning model based at least on the most recent data feed received from the component; and
train the machine learning model based on the generated training dataset, wherein each iteration is performed according to a pre-configured schedule or when the deviation is detected.

4. The system of claim 1, wherein the at least one processor is further configured to:
for at least one of the components:
predict, based on a most recent data feed received from the at least one component and using the iterative machine learning method that an anomaly associated with the component does not exist; and
add at least a portion of the most recent data feed to the normal state vector of the component.

5. The system of claim 1, wherein:
the component is a hardware device including at least one sensor measuring at least one performance related parameter associated with the hardware device according to a pre-determined schedule;
the data feed received from the hardware device comprises at least one measured value of the at least one parameter;
the current state vector comprises a most recent measured value of the at least one parameter received in the data feed from the hardware device;
the normal state vector of the hardware device comprises a normal value or normal range of values of the at least one parameter associated with normal operation of the hardware device;
the at least one processor is configured to determine the current state vector for the hardware device deviates from the normal state vector of the hardware device when the most recent measured value of the at least one parameter does not equal the normal value or is not within the normal range of values of the normal state vector.

6. The system of claim 1, further comprising:
an Internet of Things (IOT) hub that collects measured values of a plurality of parameters from sensors associated with a plurality of hardware devices and transmits a data feed to the central data repository including the measured values of the plurality of parameters associated with the plurality of hardware devices;

wherein the at least one processor is further configured to:
store the data feed including the measured values of the plurality of parameters associated with the plurality of hardware devices in the centralized data repository;
for each hardware device:
search the centralized data repository for the measured values of the parameters associated with the hardware device;
segregate the measured values by the parameters; and
generate the current state vector for the hardware device including the most recent measured values of one or more parameters.

7. The system of claim 1, wherein the at least one processor is further configured to:
search a repository for the at least one pre-configured action corresponding to the predicted anomaly, wherein the repository includes a plurality of known anomalies relating to the component and one or more suggested corrective actions corresponding to each known anomaly; and
identify the at least one pre-configured action corresponding to the predicted anomaly based on the search.

8. The system of claim 1, wherein the at least one processor uses quantum computing to process data.

9. A method for managing anomalies in a production computing environment, comprising:
receiving a data feed relating to one or more of a plurality of components of the production computing environment, wherein the data feed received for each component includes information relating to performance of the component, wherein the plurality of components includes at least one hardware component and at least one software component, wherein the at least one hardware component comprises a hardware device and the at least one software component comprises a software application;
storing the data feed received for each component in a centralized data repository as a data log;
for each component:
generating a current state vector based on the respective data log relating to the component, wherein the current state vector represents a current performance of the component;
comparing the current state vector of the component with a normal state vector of the component, wherein the normal state vector represents normal performance of the component;
determining that the current state vector of the component deviates, at least in part, from the normal state vector of the component;
in response to detecting the deviation, predicting an anomaly associated with the component using an iterative machine learning method based at least on the data log of the component and the determined deviation, wherein the iterative machine learning method uses a plurality of machine learning models to predict the anomaly and iteratively updates training of each of the machine learning models using at least the most current data feed received for the component;
identifying a system configuration needed to run a current workload associated with the component, wherein the current workload includes processing at least one software application;
searching each of a plurality of cloud infrastructures for a cloud instance that can support the identified system configuration;
identifying, based on the search, a cloud instance of a cloud infrastructure that can support the identified system configuration;
switching the current workload from an original system running the current workload to the identified cloud instance;
correcting the anomaly by taking at least one pre-configured action corresponding to the predicted anomaly; and
after correcting the anomaly, switching back the current workload from the identified cloud instance to the original system.

10. The method of claim 9, wherein predicting the anomaly associated with the component comprises:
generating the plurality of machine learning models, wherein each machine learning model uses a different algorithm to predict an anomaly associated with the component;
predicting an anomaly using each of the plurality of machine learning models based at least on the most recent data feed received from the component;
comparing results from the predicting the anomaly using each of the plurality of machine learning models;
selecting, based on the results, one of the machine learning models having a highest accuracy associated with the prediction of the anomaly; and
selecting the anomaly predicted by the selected machine learning model as the predicted anomaly of component.

11. The method of claim 9, wherein iteratively updating training of each of the machine learning models for predicting the anomaly corresponding to the component comprises:
at each iteration:
generating a training dataset for the machine learning model based at least on the most recent data feed received from the component; and
training the machine learning model based on the generated training dataset, wherein each iteration is performed according to a pre-configured schedule or when the deviation is detected.

12. The method of claim 9, further comprising:
for at least one of the components:
predicting, based on a most recent data feed received from the at least one component and using the iterative machine learning method that an anomaly associated with the component does not exist; and
adding at least a portion of the most recent data feed to the normal state vector of the component.

13. The method of claim 9, wherein:
the component is a hardware device including at least one sensor measuring at least one performance related parameter associated with the hardware device according to a pre-determined schedule;
the data feed received from the hardware device comprises at least one measured value of the at least one parameter;
the current state vector comprises a most recent measured value of the at least one parameter received in the data feed from the hardware device;
the normal state vector of the hardware device comprises a normal value or normal range of values of the at least one parameter associated with normal operation of the hardware device;
further comprising determining the current state vector for the hardware device deviates from the normal state vector of the hardware device when the most recent measured value of the at least one parameter does not equal the normal value or is not within the normal range of values of the normal state vector.

14. The method of claim 9, further comprising:
receiving a data feed from an Internet of Things (IOT) hub, the data feed including measured values of a plurality of parameters from sensors associated with a plurality of hardware devices;
storing the data feed including the measured values of the plurality of parameters associated with the plurality of hardware devices in the centralized data repository;
for each hardware device:
searching the centralized data repository for the measured values of the parameters associated with the hardware device;
segregating the measured values by the parameters; and
generating the current state vector for the hardware device including the most recent measured values of one or more parameters.

15. A non-transitory computer-readable medium for managing anomalies in a production computing environment, wherein the non-transitory computer-readable medium stores instructions which when executed by a processor performs a method comprising:
receiving a data feed relating to one or more of a plurality of components of the production computing environment, wherein the data feed received for each component includes information relating to performance of the component, wherein the plurality of components includes at least one hardware component and at least one software component, wherein the at least one hardware component comprises a hardware device and the at least one software component comprises a software application;
storing the data feed received for each component in a centralized data repository as a data log;
for each component:
generating a current state vector based on the respective data log relating to the component, wherein the current state vector represents a current performance of the component;
comparing the current state vector of the component with a normal state vector of the component, wherein the normal state vector represents normal performance of the component;
determining that the current state vector of the component deviates, at least in part, from the normal state vector of the component;
in response to detecting the deviation, predicting an anomaly associated with the component using an iterative machine learning method based at least on the data log of the component and the determined deviation, wherein the iterative machine learning method uses a plurality of machine learning models to predict the anomaly and iteratively updates training of each of the machine learning models using at least the most current data feed received from the component;
identifying a system configuration needed to run a current workload associated with the component, wherein the current workload includes processing at least one software application;
searching each of a plurality of cloud infrastructures for a cloud instance that can support the identified system configuration;
identifying, based on the search, a cloud instance of a cloud infrastructure that can support the identified system configuration;
switching the current workload from an original system running the current workload to the identified cloud instance;
correcting the anomaly by taking at least one pre-configured action corresponding to the predicted anomaly; and
after correcting the anomaly, switching back the current workload from the identified cloud instance to the original system.

16. The non-transitory computer-readable medium of claim 15, wherein predicting the anomaly associated with the component comprises:
generating the plurality of machine learning models, wherein each machine learning model uses a different algorithm to predict an anomaly associated with the component;
predicting an anomaly using each of the plurality of machine learning models based at least on the most recent data feed received from the component;
comparing results from the predicting the anomaly using each of the plurality of machine learning models;
selecting, based on the results, one of the machine learning models having a highest accuracy associated with the prediction of the anomaly; and
selecting the anomaly predicted by the selected machine learning model as the predicted anomaly of component.

17. The non-transitory computer-readable medium of claim 15, wherein iteratively updating training of each of the machine learning models for predicting the anomaly corresponding to the component comprises:
at each iteration:
generating a training dataset for the machine learning model based at least on the most recent data feed received from the component; and
training the machine learning model based on the generated training dataset, wherein each iteration is performed according to a pre-configured schedule or when the deviation is detected.

18. The non-transitory computer-readable medium of claim 15, wherein the method performed by the processor further comprises:
for at least one of the components:
predicting, based on a most recent data feed received from the at least one component and using the iterative machine learning method that an anomaly associated with the component does not exist; and
adding at least a portion of the most recent data feed to the normal state vector of the component.

19. The non-transitory computer-readable medium of claim 15, wherein:
the component is a hardware device including at least one sensor measuring at least one performance related parameter associated with the hardware device according to a pre-determined schedule;
the data feed received from the hardware device comprises at least one measured value of the at least one parameter;
the current state vector comprises a most recent measured value of the at least one parameter received in the data feed from the hardware device;
the normal state vector of the hardware device comprises a normal value or normal range of values of the at least one parameter associated with normal operation of the hardware device;

further comprising determining the current state vector for the hardware device deviates from the normal state vector of the hardware device when the most recent measured value of the at least one parameter does not equal the normal value or is not within the normal range of values of the normal state vector.

20. The non-transitory computer-readable of claim 15, wherein the method performed by the processor further comprises:
  receiving a data feed from an Internet of Things (IOT) hub, the data feed including measured values of a plurality of parameters from sensors associated with a plurality of hardware devices;
  storing the data feed including the measured values of the plurality of parameters associated with the plurality of hardware devices in the centralized data repository;
  for each hardware device:
    searching the centralized data repository for the measured values of the parameters associated with the hardware device;
    segregating the measured values by the parameters; and
    generating the current state vector for the hardware device including the most recent measured values of one or more parameters.

* * * * *